(12) United States Patent
Lewis et al.

(10) Patent No.: US 11,712,952 B2
(45) Date of Patent: Aug. 1, 2023

(54) PIVOTAL SOFT TOP COVER WITH SECONDARY BOW LINKED

(71) Applicant: Bestop, Inc., Louisville, CO (US)

(72) Inventors: Stephen J. Lewis, Harrison Township, MI (US); Eric D. Getzschman, New Baltimore, MI (US); Duane C. Junkin, Madison Heights, MI (US); David A. Smith, Macomb Township, MI (US); Charles C. Turney, Toledo, OH (US); Edward S. Piec, Warren, MI (US); Jonathon G. Moore, Chesterfield, MI (US); Brandon Kincaid, Curtice, OH (US); Eric J. Hanson, Dearborn, MI (US)

(73) Assignee: Bestop Inc., Louisville, CO (US)

( * ) Notice: Subject to any disclaimer, the term of this patent is extended or adjusted under 35 U.S.C. 154(b) by 70 days.

(21) Appl. No.: 17/375,761

(22) Filed: Jul. 14, 2021

(65) Prior Publication Data

US 2022/0016962 A1 Jan. 20, 2022

Related U.S. Application Data

(60) Provisional application No. 63/175,409, filed on Apr. 15, 2021, provisional application No. 63/051,645, filed on Jul. 14, 2020.

(51) Int. Cl.
*B60J 7/12* (2006.01)
*B60J 1/18* (2006.01)
(Continued)

(52) U.S. Cl.
CPC ............ *B60J 7/1291* (2013.01); *B60J 1/1823* (2013.01); *B60J 7/12* (2013.01); *B60J 7/1234* (2013.01);
(Continued)

(58) Field of Classification Search
CPC . B60J 7/12; B60J 7/1226; B60J 7/1234; B60J 7/1239; B60J 7/1243; B60J 7/1252;
(Continued)

(56) References Cited

U.S. PATENT DOCUMENTS

| 6,443,519 B1 * | 9/2002 | Betzl ..................... B60J 10/90 296/213 |
| 10,035,408 B2 * | 7/2018 | Crismon .................. B60J 7/11 |

(Continued)

FOREIGN PATENT DOCUMENTS

JP 6194816 A * 5/1986 ............. B60J 10/90

OTHER PUBLICATIONS

Hiroshi et al., "Seal Device for Vehicle Having Convertible Top", Published Date: May 13, 1986, Publisher: Japanese Patent Office/ European Patent Office, vol. JP6194816A (Year: 1986).*

(Continued)

*Primary Examiner* — Dennis H Pedder
*Assistant Examiner* — Joyce Eileen Hill
(74) *Attorney, Agent, or Firm* — Warn Partners, P.C.

(57) ABSTRACT

A soft top cover assembly including a pivotal portion adapted for attaching at a roof top opening of a vehicle to selectively close off the roof top opening and open up the roof top opening for an open-air experience. The assembly has a cover attached to a first bow member of the pivotal portion and a rear header. Selectively rotating the pivotal portion covers and uncovers the roof top opening. The assembly has at least one pair of shutface appliques adjacent to the sides of the roof top opening. At least one pair of rear (Continued)

side belt mounts incorporating a belt rail and adapted to connect to the vehicle and operable to attach LH/RH rear side windows.

17 Claims, 25 Drawing Sheets

(51) Int. Cl.
    *B60R 13/04*     (2006.01)
    *B60R 13/06*     (2006.01)
    *B60J 10/90*     (2016.01)

(52) U.S. Cl.
    CPC .............. *B60J 7/1265* (2013.01); *B60J 10/90* (2016.02); *B60R 13/04* (2013.01); *B60R 13/06* (2013.01)

(58) Field of Classification Search
    CPC ........ B60J 7/1265; B60J 7/1291; B60J 10/90; B60J 1/18; B60J 1/1823; B60R 13/04; B60R 13/06

USPC ........................... 296/1.08, 107.16, 214, 219
See application file for complete search history.

(56) References Cited

U.S. PATENT DOCUMENTS

2015/0352937 A1* 12/2015 Haberkamp ............. B60J 10/90
    296/219
2018/0043757 A1*  2/2018 Haberkamp ........... B60J 7/1291
2018/0297456 A1* 10/2018 Stickles ................... B60J 10/70

OTHER PUBLICATIONS

PCT International Search Report for PCT/US2021/041624, "Pivotal Soft Top Cover With Secondary Bow Linked", dated Jul. 14, 2020, vol. WO2022015852 (Year: 2020).*

Verkerk, PCT International Written Opinion of the International Searching Authority, for PCT/US2021/041624, "Pivotal Soft Top Cover With Secondary Bow Linked", dated Oct. 4, 2021, vol. WO2022015852 (Year: 2021).*

* cited by examiner

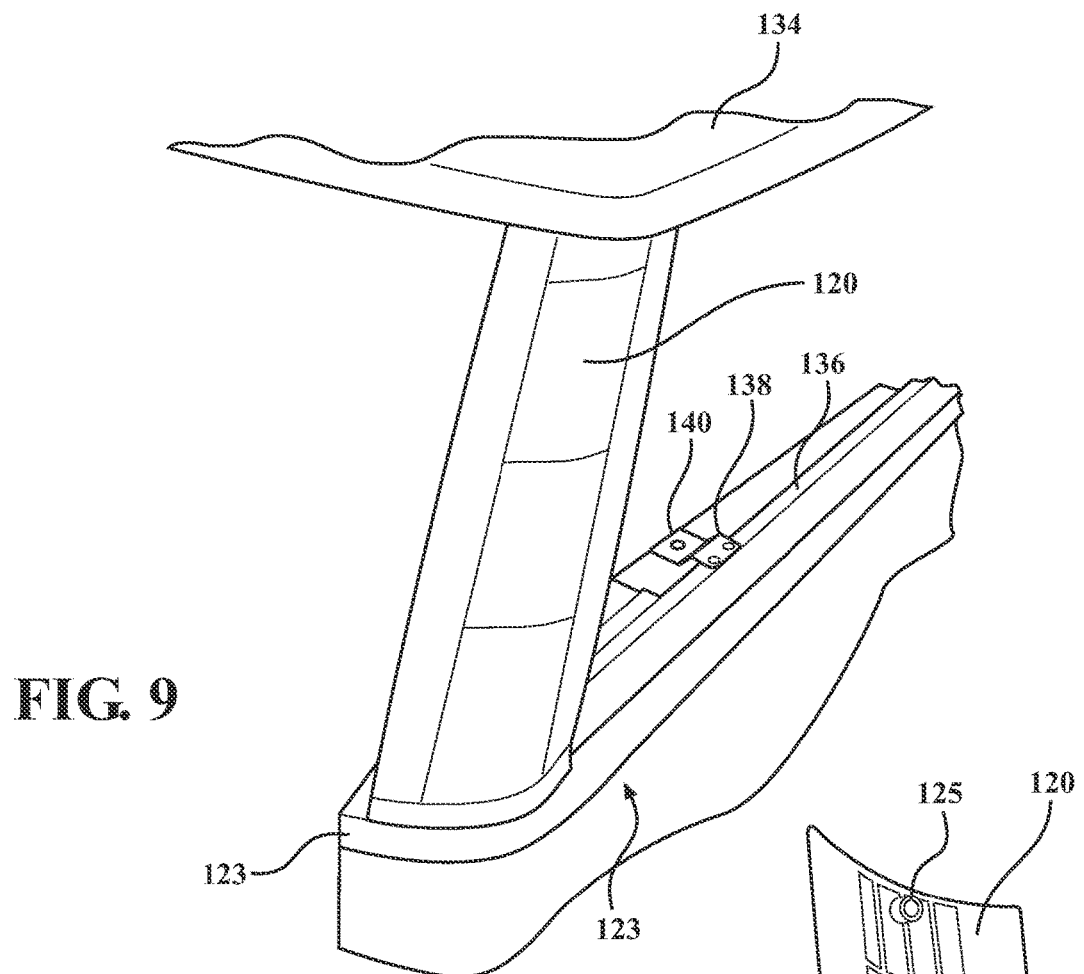
FIG. 9
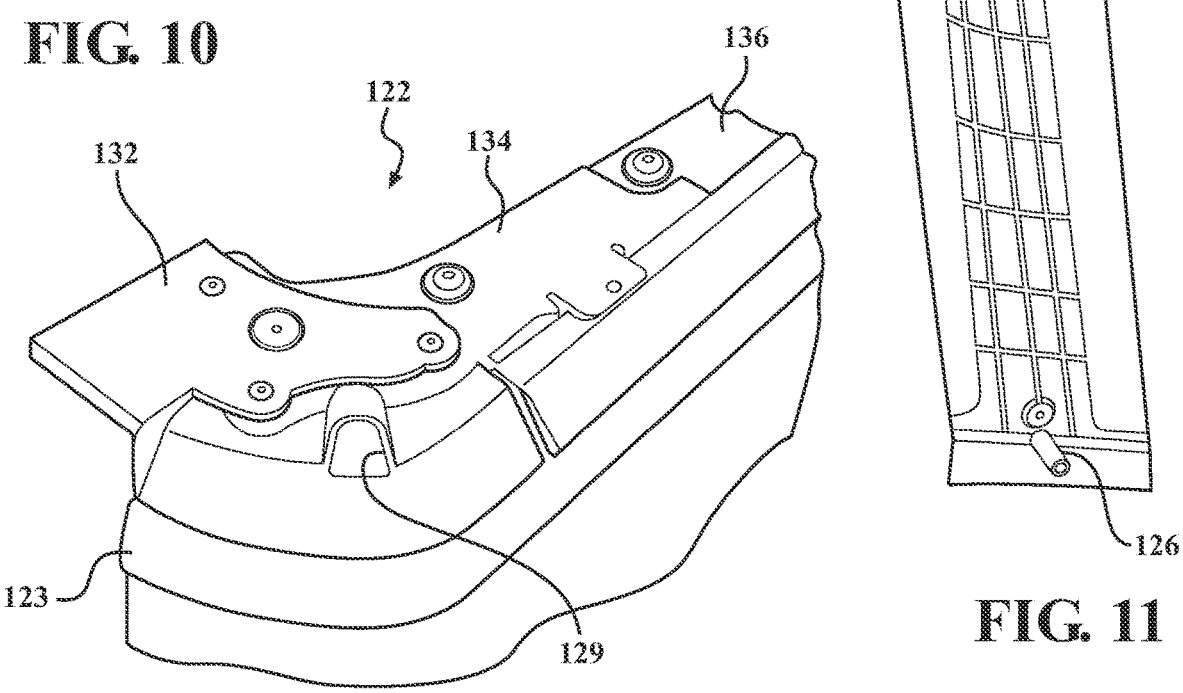
FIG. 10
FIG. 11

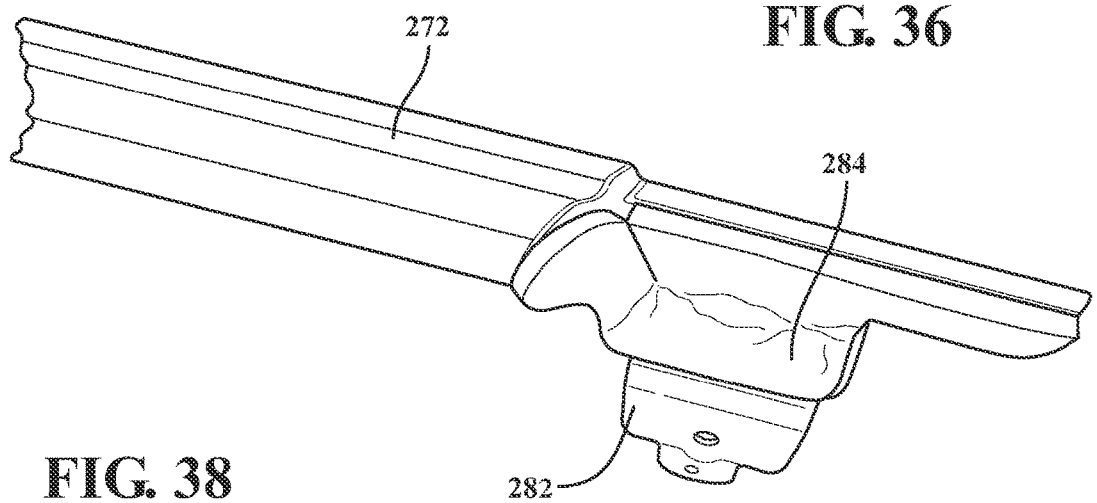
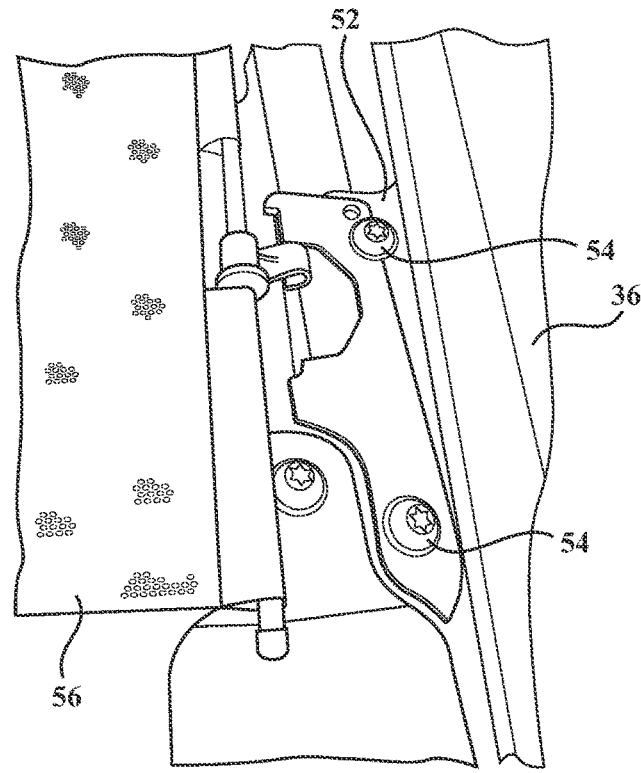
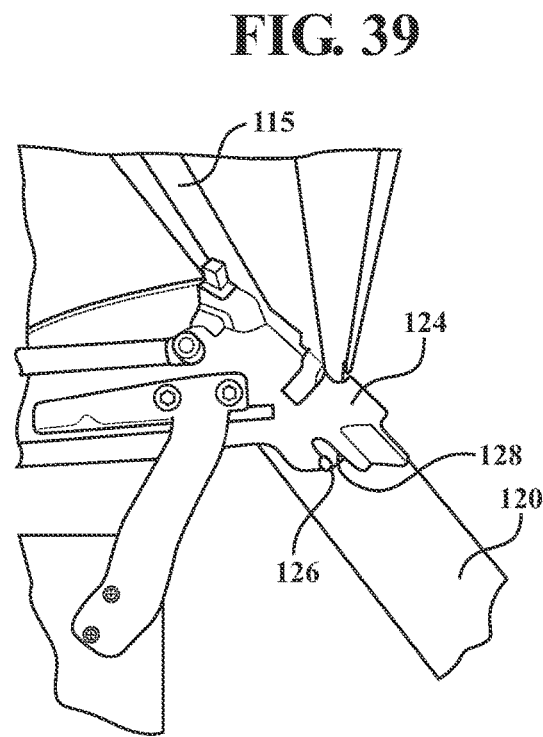

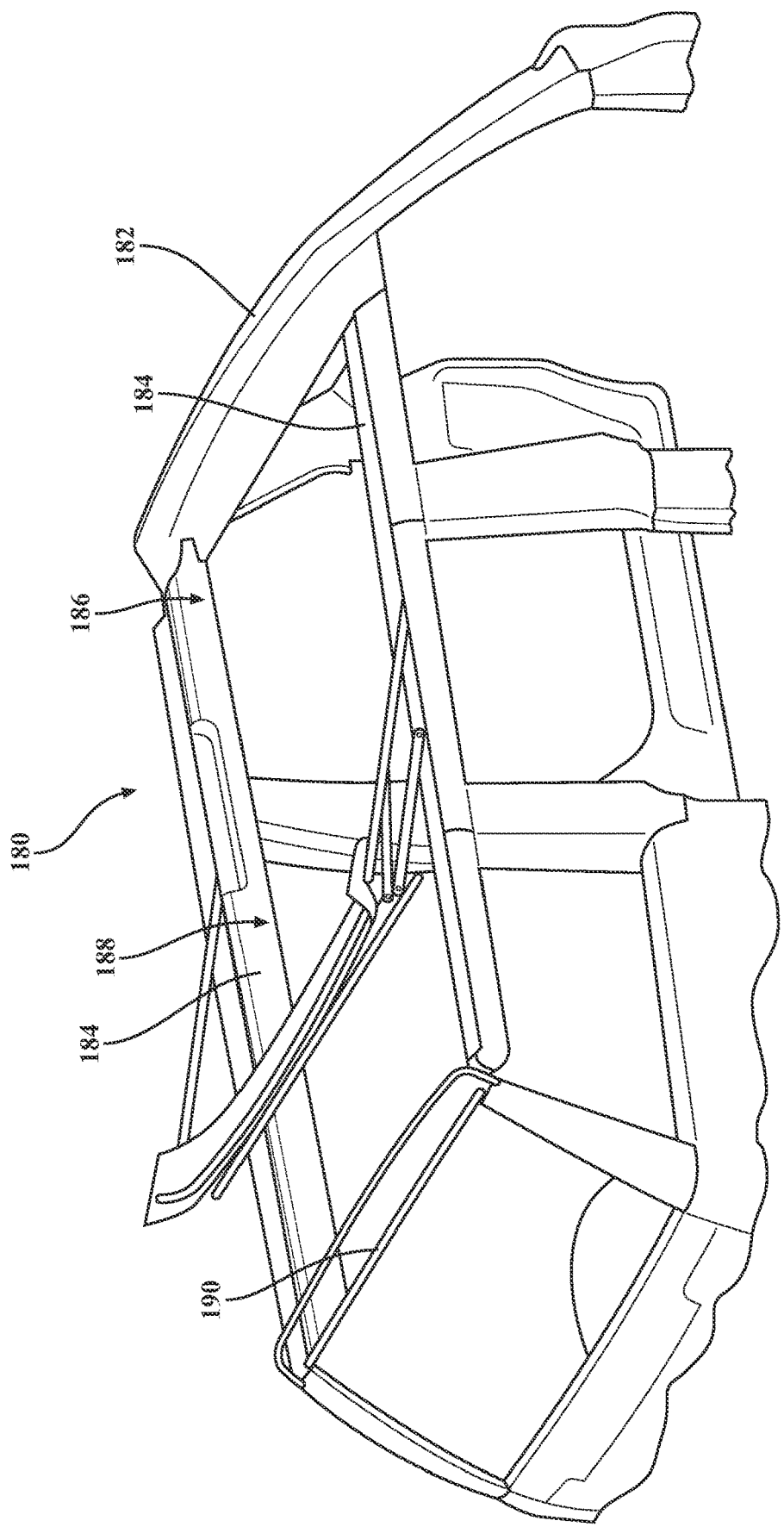

PIVOTAL SOFT TOP COVER WITH SECONDARY BOW LINKED

CROSS-REFERENCE TO RELATED APPLICATIONS

This application claims the benefit of U.S. Provisional Application No. 63/051,645, filed Jul. 14, 2020, and U.S. Provisional Application No. 63/175,409, filed Apr. 15, 2021. The disclosures of the above applications are incorporated herein by reference.

FIELD OF THE INVENTION

The present invention relates to a folding soft top of a vehicle.

BACKGROUND OF THE INVENTION

Foldable soft tops for SUV vehicles are known in the art. These tops provide a vehicle with an open air experience with the top folded back or provide protection from the elements with the top folded forward. Such tops are typically manually retractable and during retraction the operator has to perform a series of manipulation of the top. Additionally, manual management and stowage of the fabric materials of the top during folding must be accomplished.

Therefore, there remains a need in the art to provide a roof top opening cover deployment that provides easier opening/closing and improved fabric management.

SUMMARY OF THE INVENTION

A pivotal soft top cover assembly, incorporated with a fixed bow or with a hinged bow. The rear header has two mounts for bolting on a retractable sunscreen that attaches to the brackets for the windshield lock points on the windshield frame. The rear header is made from a composite (e.g., glass fiber reinforced thermoplastics (e.g., ABS vacuum formed injected molded, rotocasted or anything else) preferable but could be any material aluminum stamped steel milled steel or any other suitable material. The side rail fabric sealing appliques have the sealing groove that the top portions pull into when it is closed. There can be a bulb sea or just a bigger doubled up material, or a cable in there etc. for tensioning at least the sides of the cover.

A 5 door top that opens over the passenger compartment and has removeable windows in the back. This top has the same side rails that the top draws into. These are similar but are attached in sections along the roll bar. These can be made as aluminum or plastic extrusions, stamped milled steel or even cast. The rear corner piece goes in by placing it in the lower mount and then rotating it up into the upper mount and securing the upper part with a fastener. There is a connection piece for tensioning the fabric to the bow and the tension of the fabric holds it into the mount and gives it a tight corner look.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 9 is a perspective view of a rear hard corner of the soft top cover assembly, in accordance with the present invention;

FIG. 10 is a perspective view of a rear hard corner mount of the soft top cover assembly, in accordance with the present invention;

FIG. 11 is a rear perspective view of the rear hard corner of the soft top cover assembly, in accordance with the present invention;

FIG. 36 is a perspective view of the shut face applique, in accordance with the present invention;

FIG. 37 is a soft top assembly in an exemplary environment of use;

FIG. 38 is a perspective view of a hard point attachment on a rear header for attachment of accessories, in accordance with the present invention; and FIG. 39 is a perspective view of the rear hard corner rear hard corner upper mount attachment of the soft top cover assembly, in accordance with the present invention.

DETAILED DESCRIPTION OF THE PREFERRED EMBODIMENTS

Figure 1:
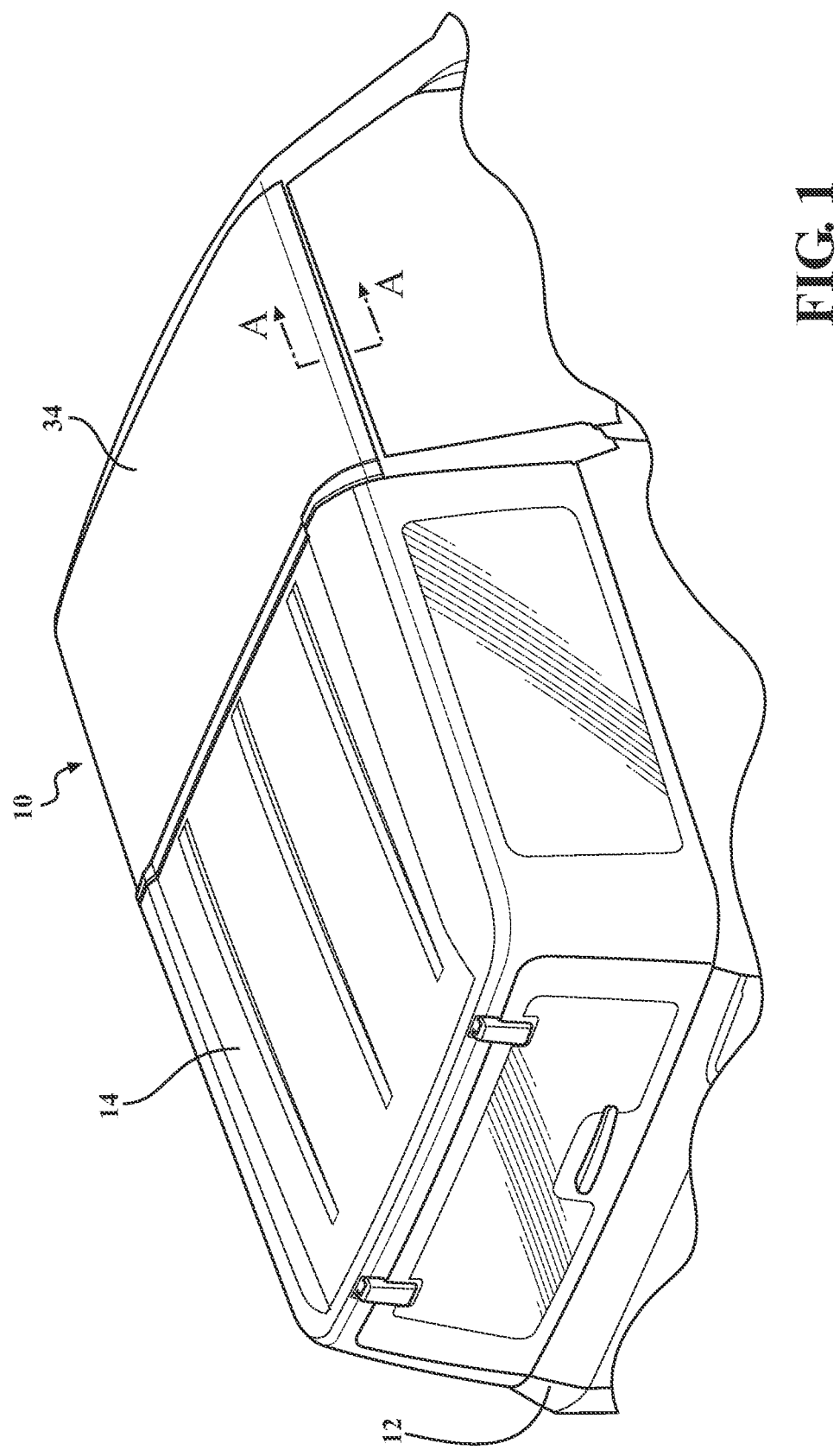
FIG. 1 is a perspective view of a soft top cover assembly on an exemplary SUV, in accordance with the present invention.

The following description of the preferred embodiment(s) is merely exemplary in nature and is in no way intended to limit the invention, its application, or uses.

Referring to the Figures generally, the present invention provides a rear header (one piece header or plurality piece header) that has at least one mount (preferably two mounts) for bolting on at least one retractable sunscreen (preferably one covering one or more roof-top opening(s) when desired) that attaches to at least one fastener (e.g., the brackets) for the windshield lock points on the windshield frame. The rear header is made from a composite (e.g., glass fiber reinforced thermoplastics. It is understood that any alternative materials and combinations are contemplated depending on the application without departure from the scope of the present invention (e.g., glass fiber reinforced thermoplastics, reinforced thermoplastics, overmolded, foamed, ABS vacuum formed injected molded, wire, rotocasted, metal, aluminum, stamped steel, milled steel and any other material suitable and any combinations thereof. Side rail fabric sealing appliques have a sealing feature, most preferably, a sealing groove that the top portions pull into (or otherwise operably move into or couple to) when the top is closed. By way of non-limiting example, at least one seal, a bulb seal, a bulb seal that is bigger doubled up material, a cable, cable ran in a sewn and/or glued pocket of material, any suitable element under tension, any suitable sealing element(s) and any combinations thereof.

According to aspects of the present invention, there is provided a 5-door vehicle top that opens over the occupant compartment(s) and has at least one, preferably a plurality of, removeable windows in the back. This top preferably has the same side rails that the top draws into, as described previously. These are similar but are attached in sections along the roll bar These can be made as aluminum or plastic extrusions, stamped mill steel, cast or any other suitable material(s) and combinations thereof. The top incorporates at least one front bow. A rear corner piece in each rear corner goes in by placing the rear corner piece in a lower mount and then rotating it up into the upper mount and securing the upper part with at least one fastener. It is understood that any suitable mounting and fasteners are contemplated depending on the application without departure from the scope of the present invention. There is at least one connection piece for tensioning the fabric to the bow (e.g., rear bow) and the tension of the fabric holds each rear corner into the mount and gives the assembly a tight corner look.

Most preferably, there is a freely rotating front bow on this top. A plurality of fasteners e.g., latches, connect to the vehicle, e.g., windshield frame, that are undone for opening up the top and operably attached for closing off the roof top opening.

There is provided a free tilting front bow on a soft top assembly adapted for securing to a vehicle, e.g., 5 door SUV, according to aspects of the present invention. Generally, it rides in the lasting of the top and tensions the top over the front seats.

There is provided a middle bow linkage on a soft top assembly adapted for securing to a vehicle, e.g., 3-door SUV, according to aspects of the present invention.

There is provided at least one bow, e.g., middle bow, that is unique because it pivots during opening and closing of the top, according to aspects of the present invention. There are stops 43 on either or both sides, e.g., on at least one link to operably set the height of the rotated top in the open position. By way of example, one bow tensions when the top is in a closed position and then the bow is allowed to pivot for allowing opening of the top (e.g., See FIGS. 5-6).

According to aspects of the present invention, there is provided an applique adapted to be operably attached to a fixed door rail, the applique forms a seal with the window. Alternatively, the applique is adapted to be attached to a roll bar.

According to aspects of the present invention, at least one tensioning member (e.g., cable wire, side tensioning, edge tensioning member, cable wire with end spring(s), seal, sewn or otherwise doubled up material, etc. and any combination thereof). The tensioning member can pull at the edge and fold into a groove for tensioning the top, by way of example.

According to aspects of the present invention, at least one applique is operably attached to the vehicle, preferably, to a respective vehicle (e.g., SUVs) upper door rail fixed to the vehicle at a roof top opening (e.g., generally between the A-pillar and B-pillar, generally between the B-pillar and a rear pillar, etc.).

According to aspects of the present invention, there is provided at least one stop (such as similar to stop 43 provided on at least a link), preferably at least two.

According to aspects of the present invention, at least one link mechanism is used. The present invention is adaptable for 3 door or 5 door vehicles or any other vehicle (front right/left doors, rear right/left doors, and rear door or tailgate).

According to aspects of the present invention, there is provided an extrusion profile (e.g., a metal add-on) across a rear halo (e.g., molded) that is attached (e.g., sewn) into the cover (e.g., fabric), preferably, positioned on a flange feature and self-locates. A rear compression panel (e.g., steal cap add on) can be added on top and driven in with a plurality of fasteners, and the fabric is operably attached.

According to aspects of the present invention, in particular in a 5-door application, a rear bracket and a second bracket welded to the rear bracket holds up the back of the rear halo. A brace that holds up the whole rear end (triangulates so that once the weight of the fabric is added, it will want to pull down).

According to aspects of the present invention, a quarter window trim provides front attachment for the window (e.g., using vertical and bottom grooves). Preferably, a bottom groove goes in front of a belt rail groove for quarter window attachment.

According to aspects of the present invention, no rivet is used; rather, bushings and utilizing knuckles into brackets (e.g., metal bracket) is used. According to aspects of the present invention, the top is an aftermarket no-drill install top.

According to aspects of the present invention, the top assembly opens up when an open roof top opening feel is desired, and does not drop down (e.g., drop down into the rear cargo tub).

According to aspects of the present invention, at least one extrusion is provided for window attachment. Preferably, the extrusion is aluminum. The extrusion has a predetermined suitable profile (preferably, generally C-shape) and the side window slides into it (no zippers). Preferably, the extrusion is adapted to attach to the vehicle body.

According to aspects of the present invention, the top is operably adapted for being a generally square rear profile. According to aspects of the present invention, the top is operably adapted for being a generally slanted back rear profile. According to aspects of the present invention, the rear of the top is operably adapted for being a generally angled down at about 15 to 45 degrees.

According to aspects of the present invention, a door rail assembly system is adapted for attaching to the vehicle and seals with the vehicle (e.g., doors, windows, etc.).

According to aspects of the present invention, a J-rail system is provided and fastened (e.g., bolted on) to the component.

According to aspects of the present invention, a tailgate bar is provided adapted for being selectively attached to the vehicle, depending on the particular application.

According to aspects of the present invention, the rear corners are hard corner systems.

According to aspects of the present invention, there is provided a rear halo assembly, front header and articulating top assembly adapted for operably coupling to the vehicle depending on the particular applications.

In accordance with aspects of the present invention, there is provided a fixed bow, and an additional aspect of the present invention with a hinged bow.

Figure 2:
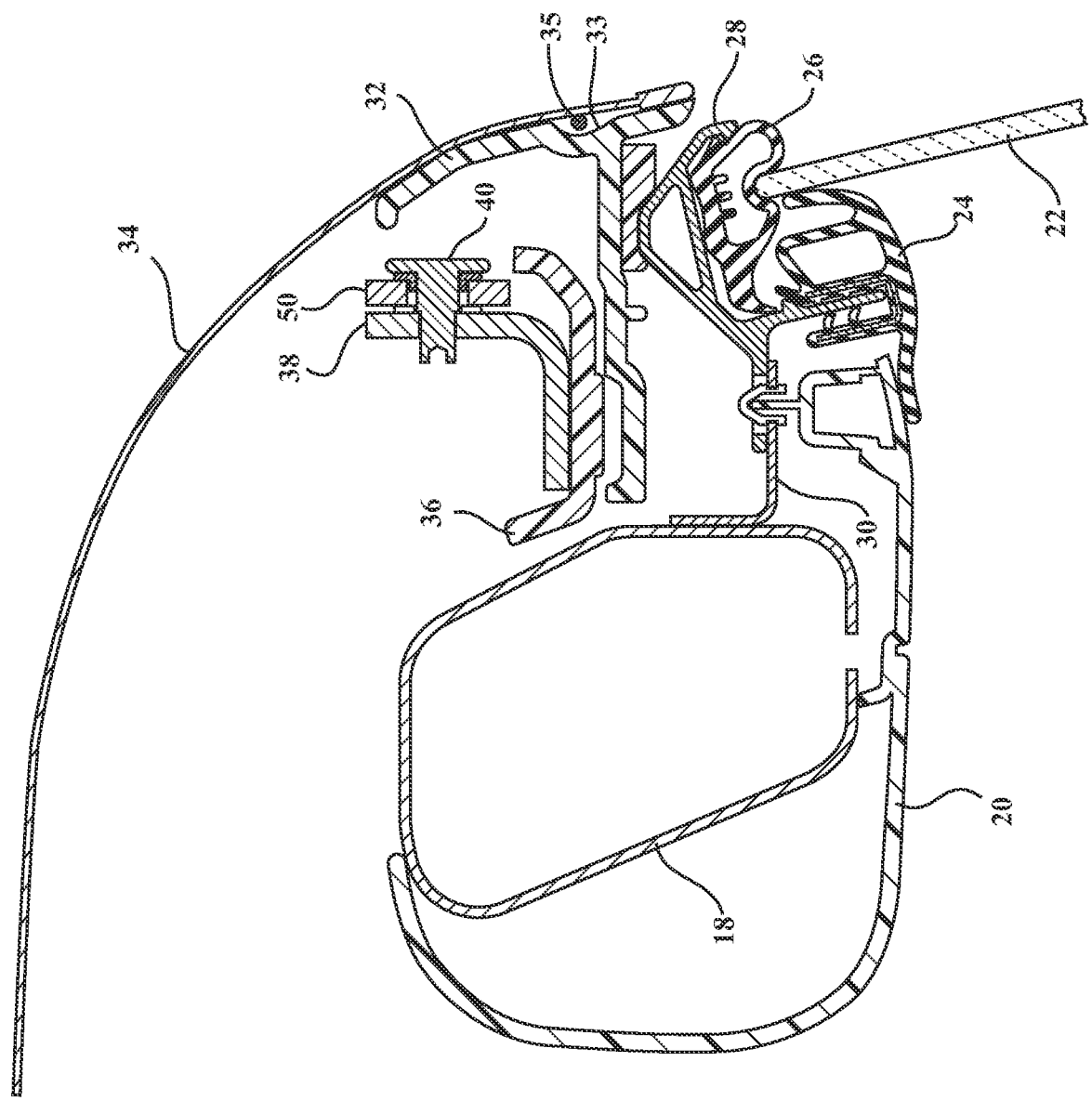
FIG. 2 is a cross sectional view of a soft top fascia/applique rail of the present invention taken at A-A in FIG. 1, in accordance with the present invention.
Figure 3:
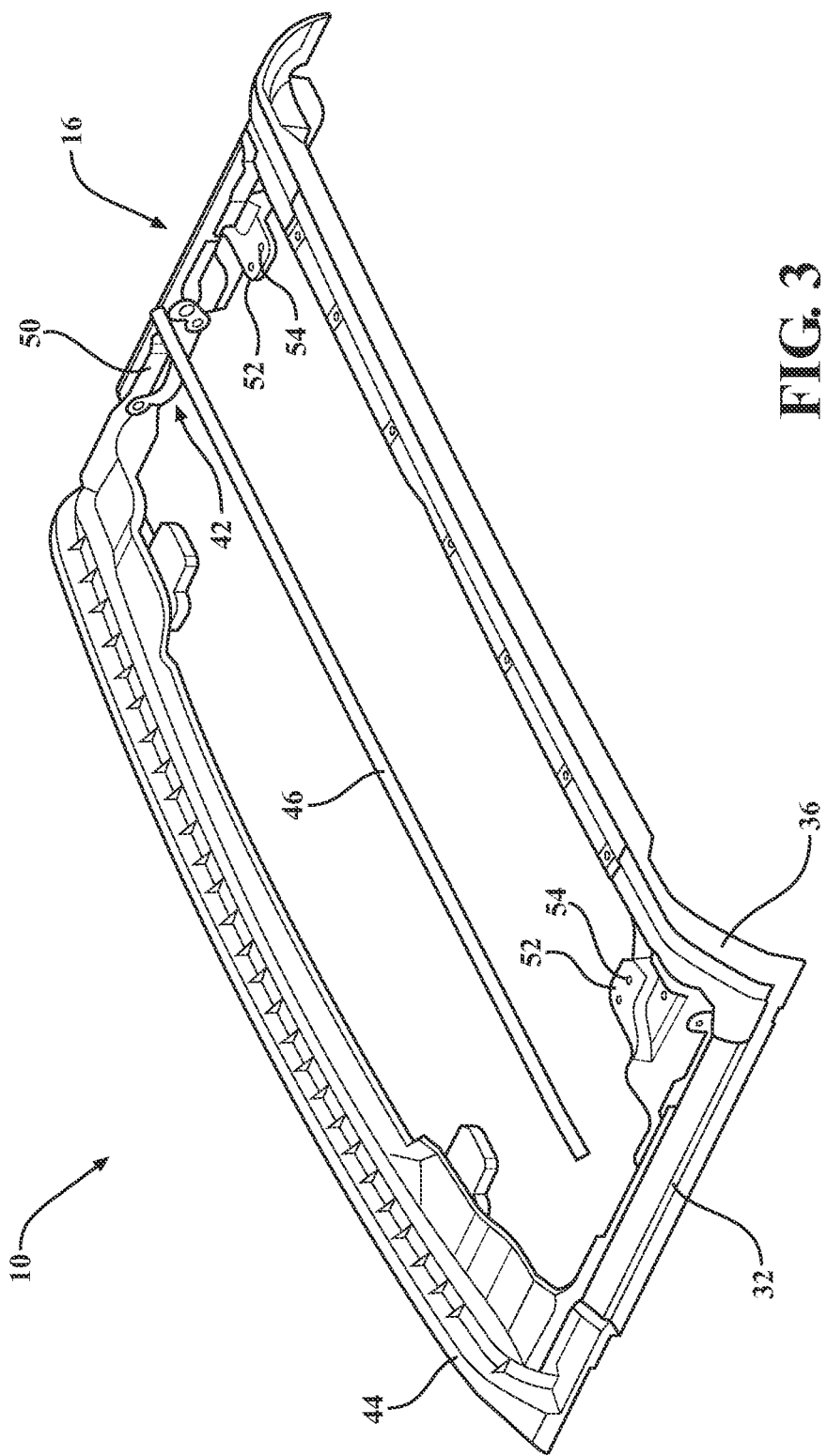
FIG. 3 is a perspective view of the soft top cover assembly, in accordance with the present invention.

Referring generally to FIGS. 1-3, there is depicted a pivotable soft top assembly shown generally at 10 adapted for a vehicle, such as exemplary vehicle 12. The assembly 10 is adapted to close off a roof top opening of the vehicle and is adapted to operably connect to the vehicle. The top 10 is adapted to include a weathertight seal engagement to the vehicle, e.g., to a hard top portion 14 or alternative structure. A pivotal portion 16 is adapted to open up the roof top opening of the vehicle, selectively rotating to open the roof top opening when an open-air experience is desired.

FIG. 2 depicts a cross section taken at A-A of FIG. 1. A roll bar 18 has a trim 20 attached. A window glass 22 (e.g., passenger side front window) engages a first seal 24 and second seal 26, held by a seal carrier 28 on the vehicle 12. A seal carrier attachment 30 attaches to the roll bar 18. In accordance with the present invention, the assembly 10 includes at least one side applique 32 (e.g., plastic side applique, not a door rail, having no shut surface interface to the door, no shut face to the door etc.). The fabric covers 34 is sealingly connected to the side applique 32 by its lower end surface having a tensioning member 35 which is sewn in or otherwise a part of the side part of the top such that as the top is moved to the closed position the tensioning member 35 is drawn toward the center of the vehicle into the groove 33 in the plastic applique 32 for providing a weather resistant sealing area at the top plastic applique interface. The tensioning member can be provided as a side cable as shown or it could be a doubled over sewn portion, or it could be an insert in a pocket in the top or any other method of providing a side longitudinal tensioning on the edges of the top for drawing it inward upon closing. In the background of FIG. 2 is depicted part of the rear header 36 (e.g., plastic rear halo). At least one pivot bracket 38 is provided and incorporates at least one pivot point 40 (e.g., spin rivet pivot point, spin rivet—pivot point 40 for at least one linkage 50 of a linkage assembly indicated generally at 42 of the pivotal portion 16 to rotate back/forward to open/close the pivotal portion to open up/close off the roof top opening (see also FIG. 3). Linkage assemblies are operably connected toward both ends of the header 44.

Referring more particularly to FIG. 3, the pivotable soft top assembly 10 includes a front header 44 adapted to selectively attach to the vehicle (e.g., to windshield frame with latches, latch mechanisms, paddle latch, adapted hooks into footman loops of the vehicle, etc.). By way of non-limiting example, the assembly 10 is operably adapted for a 5-door vehicle. The cover 34 is operably connected to the front header 44. The cover 34 is also operably connected to the rear header 36. The assembly 10 includes at least one additional bow 46, e.g., a fabric management bow with the cover 34 operably listed to or connected thereto (e.g., connected via sewn, adhered, cover extrusion in a bow 46 channel, etc.). The bow 46 can have free ends but sits in listing in the top cover 34. The bow 46 is preferably a pivotable bow at pivot joint 48 (e.g., see FIGS. 4-6). Alternatively, the bow 46 is fixed relative to the links with no pivot joint feature (e.g., see FIGS. 13-14).

Additionally, the rear header preferably has at least one hard point attachment 52, preferably, a plurality of hard point attachments, most preferably, at least two hard point attachments. Preferably, a pair of the hard point attachments 52 are located on opposingly disposed interior sides of the rear header 36 at opposite sides of the roof top opening. Preferably, at least one aperture 54 is provided on each attachment portion 52 adapted for receiving a fastener 41. These attachments 52 allow for operably coupling at least one of various predetermined accessories such as a sunshade 56 to be attached to the rear header 36 (e.g., see also FIG. 38). By way of example, a roll up sunshade is attached at the rear header 36 and can be unrolled in a generally forward direction and is adapted to operably secure the at the front windshield area by brackets or the existing top latches, fasteners, or the like. Any other predetermined accessory is contemplated depending on the application without departure from the scope of the present invention.

Figure 5:
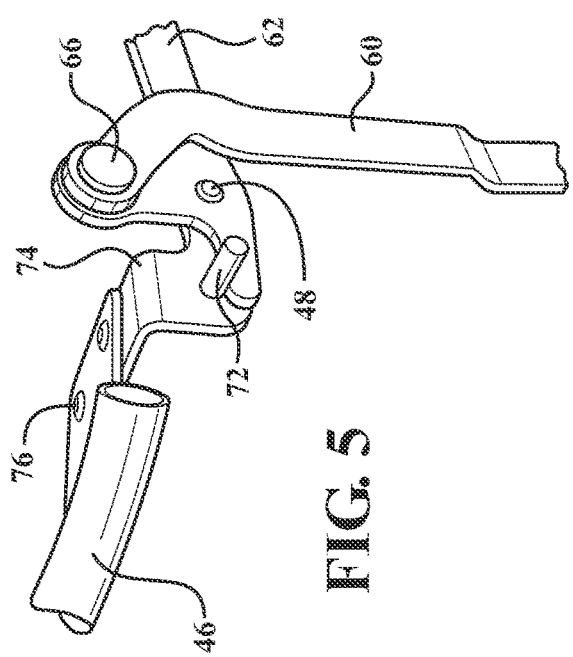
FIG. 5 is a perspective view of the soft top cover assembly, in accordance with the present invention.
Figure 6:
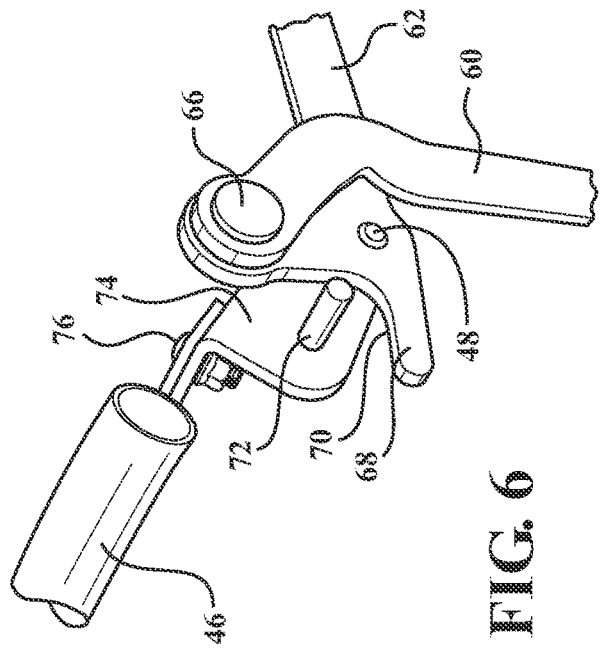
FIG. 6 is a perspective view of the soft top cover assembly, in accordance with the present invention.
Figure 4:
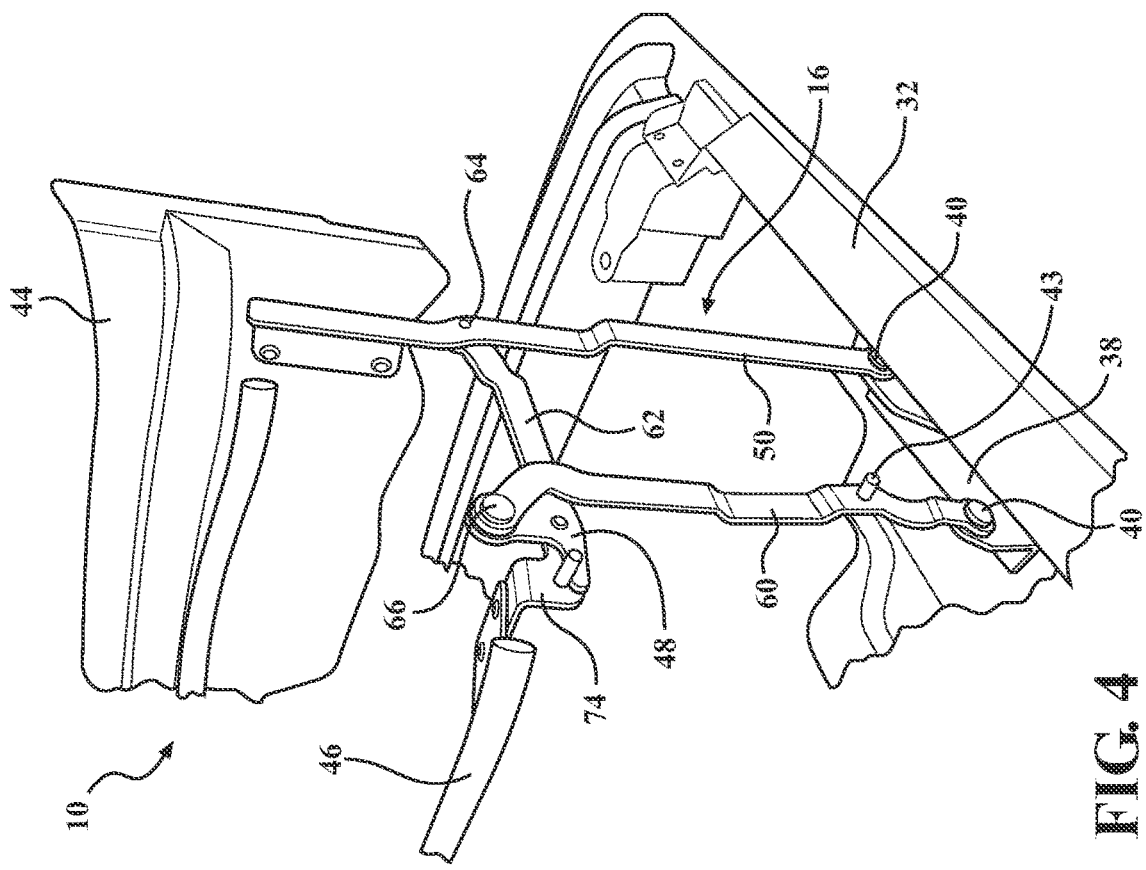
FIG. 4 is a perspective view of the soft top cover assembly, in accordance with the present invention.
Figure 7:
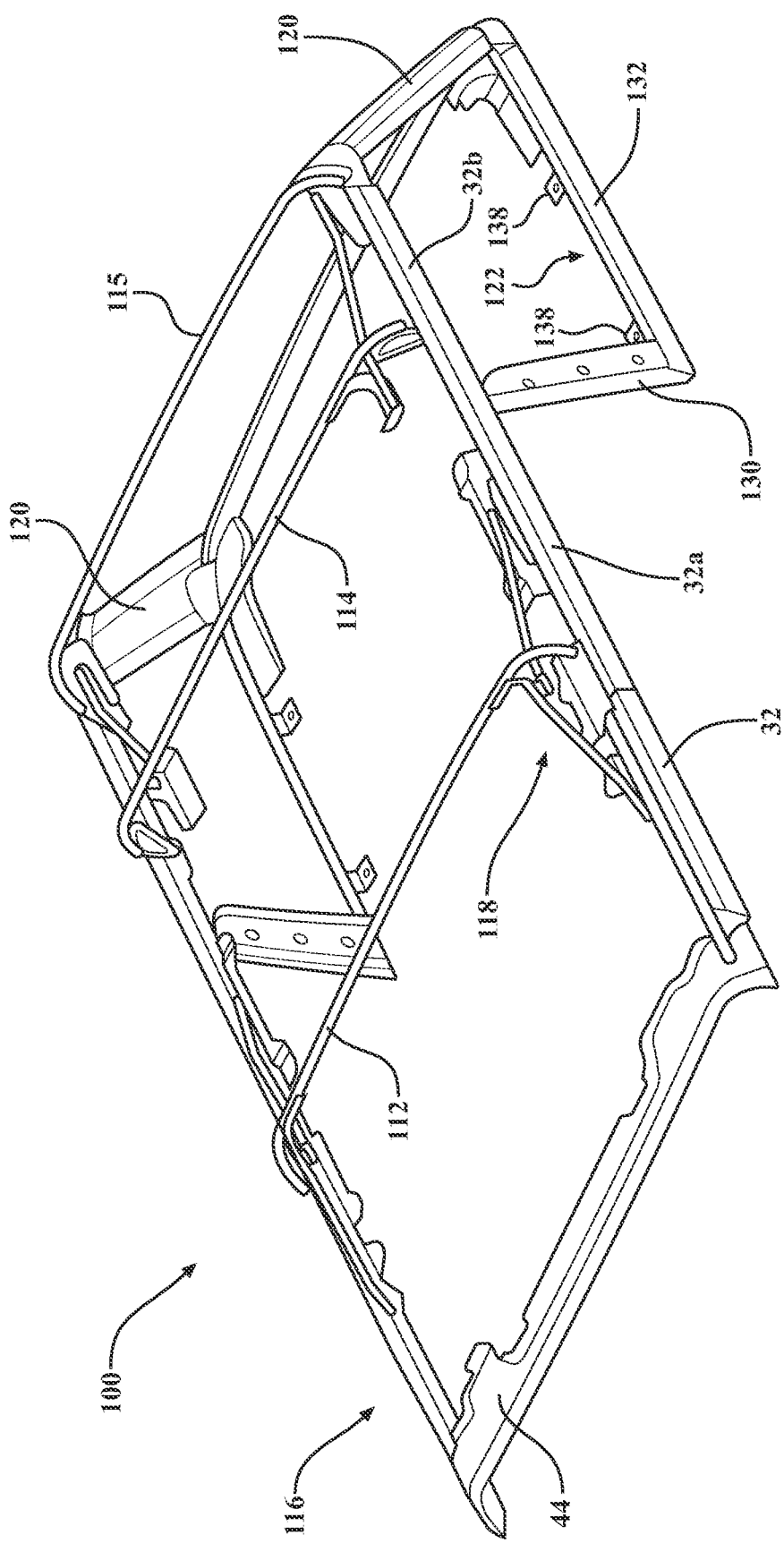
FIG. 7 is a perspective view of a soft top cover assembly, in accordance with aspects of the present invention.
Figure 8:
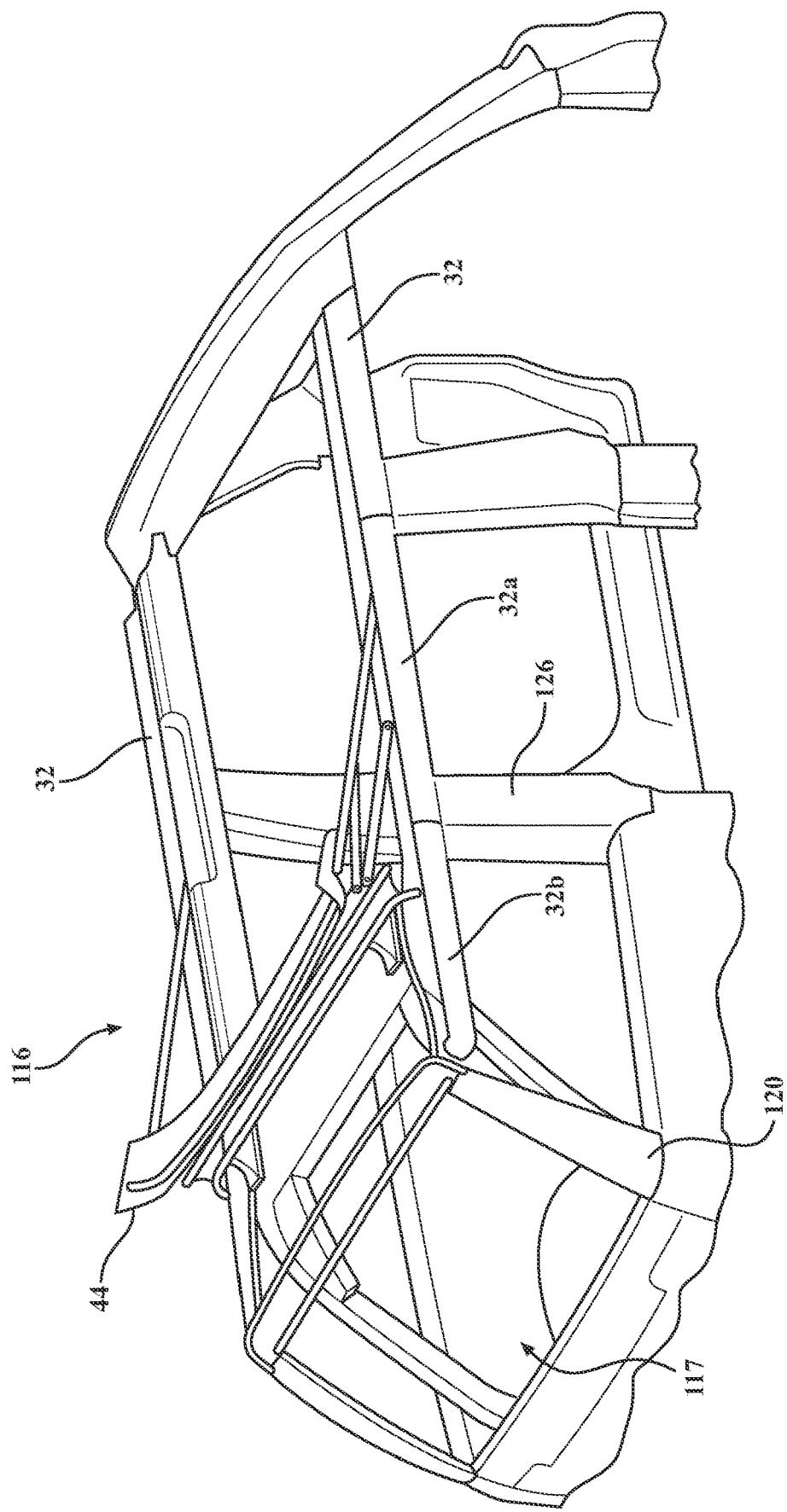
FIG. 8 is a perspective view of the soft top cover assembly, according to aspects of the present invention.
Figure 12:
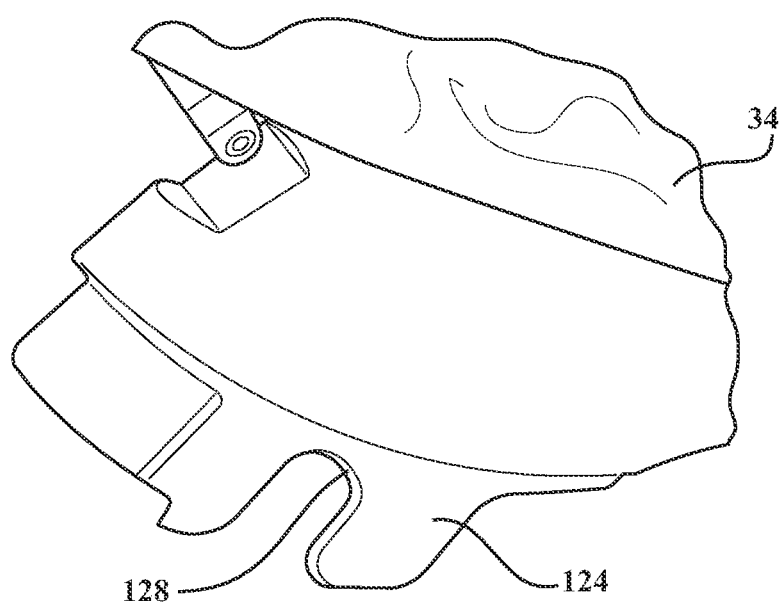
FIG. 12 is a perspective view of a rear hard corner upper mount of the soft top cover assembly, in accordance with the present invention.

Referring more particularly to FIGS. 4-6, the bow 46 is preferably a pivotable bow. The pivotal portion 16 comprises a plurality of links. Preferably, a first link 50 is rotatably connected at one pivot joint 40 provided on the bracket 38. The other end of the first link 50 is operably connected to the header 44. Preferably, a second link 60 is rotatably connected at one other pivot joint 40 provided on the bracket 38. It is understood that, alternatively, either or both links 50 and 60 operably adapted to connect to the vehicle (e.g., a sport bar, frame, cross member, to the same or different element, or any other suitable vehicle structure adjacent the roof top opening of the vehicle). The cover 34 is operably connected to the front header 44 and the rear header 36. The header 44 is operably connected between a pair of the first links 50,50. This top preferably has the substantially identical side appliques 32 with the longitudinal 35 sealing groove as described previously and incorporated here.

An intermediate link 62 is operably rotatably connected to the first link 50 at first joint 64. The intermediate link 62 is operably rotatably connected to the second link 60 at second joint 66. An integrally formed protruding element 68 of the intermediate link 62 has a stop surface 70 that operably stops rotation of the bow 46. Preferably, a pin 72 is provided on a rotatable bracket 74 rotatably connected to the second link 60 at second joint 66. The rotatable bracket 74 is also operably connected to the bow 46 (e.g., by a mounting plate fastened or welded to the bow 46 and including a plurality of fasteners 76 connected to the rotatable bracket 74. Thus, when the rotatable bracket 74 is automatically rotated in a first direction when rotating the pivotal portion 16 (e.g., via the cover 34 drawing the bow 46/bracket 46), the bracket 74 is stopped from further rotation when the pin 72 contacts a surface on the intermediate link 62; and when the rotatable bracket 74 is automatically rotated in a second direction (e.g., via the cover 34 or gravity drawing the bow 46/bracket 46) when rotating the pivotal portion 16, the bracket 74 is stopped from further rotation when the pin 72 contacts the stop surface 70 on the intermediate link 62. The stop rotation surfaces are preferably located toward the end of the intermediate link 62, most preferably, aft of the second link 60 relative to the vehicle, and preferably form a generally C-shaped guide/stop integrated surface for the pin 72 to rotate only a predetermined amount in the first and second directions. The assembly 10 is rotatable between a closed position (e.g., FIG. 1) closing off the roof top opening and at least an open sunroof position. Preferably, the assembly 10 is substantially an insert adapted to connect to the vehicle 12 at a roof top opening.

Figure 13:
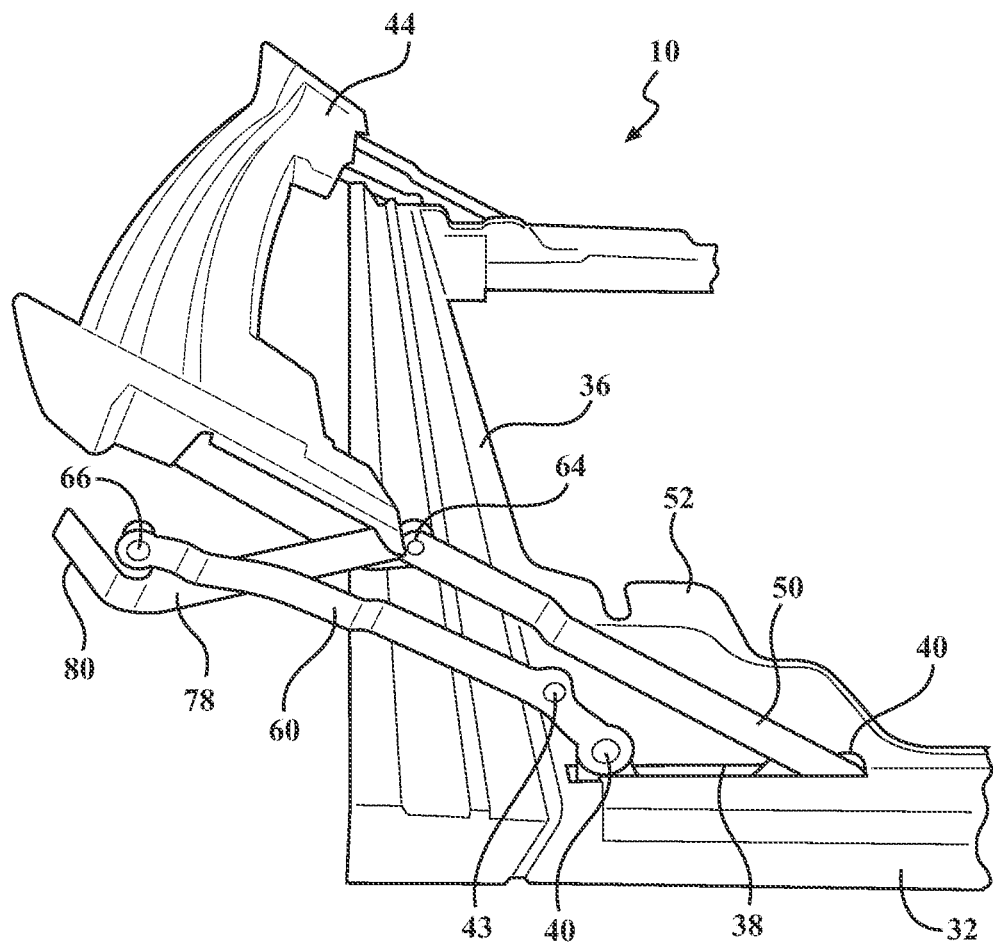
FIG. 13 is a perspective view of the soft top cover assembly, according to aspects of the present invention.
Figure 14:
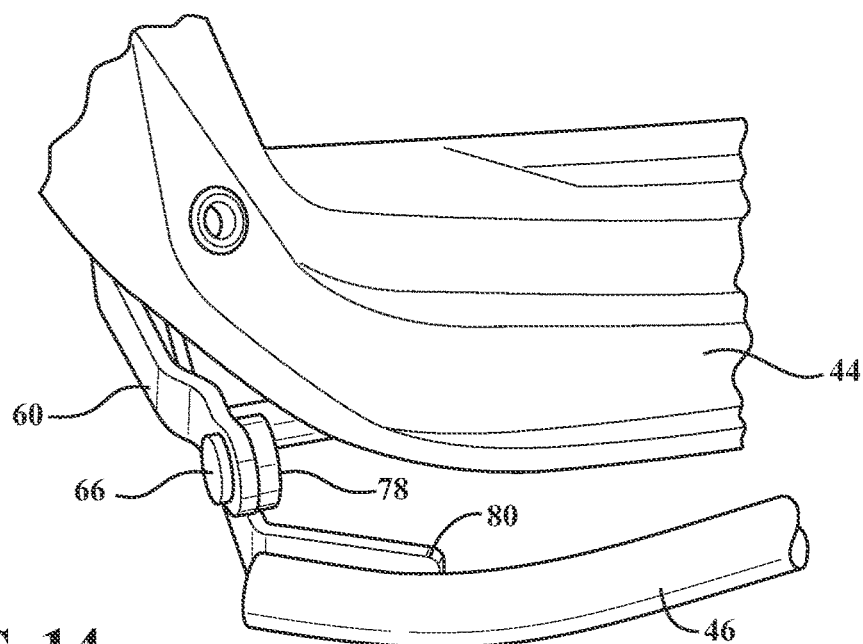
FIG. 14 is a perspective view of the soft top cover assembly, according to aspects of the present invention.
Figure 15:
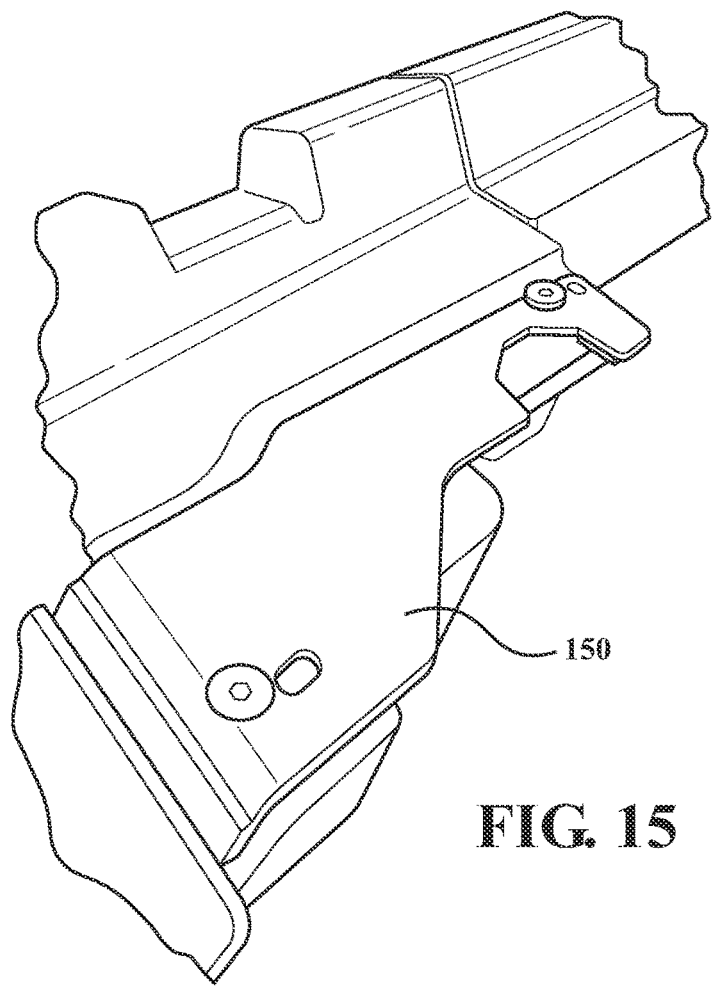
FIG. 15 is a perspective view of the soft top cover assembly, according to aspects of the present invention.

Referring more particularly to FIGS. 13-14, which can be substantially identical to FIGS. 4-6 according to aspects of the present invention but the bow 46 is fixed and does not rotate. The pivotal portion 16 comprises a plurality of links. Preferably, a first link 50 is rotatably connected at one pivot joint 40 provided on the bracket 38. The other end of the first link 50 is operably connected to the header 44. Preferably, a second link 60 is rotatably connected at one other pivot joint 40 provided on the bracket 38. It is understood that, alternatively, either or both links 50 and 60 operably adapted to connect to the vehicle (e.g., a sport bar, rollover cage, roll bar 30, frame, cross member, to the same or different element, or any other suitable vehicle structure adjacent the roof top opening of the vehicle). The cover 34 is operably connected to the front header 44 and the rear header 36. The header 44 is operably connected between a pair of the first links 50,50. The assembly 10 is rotatable between a closed position (e.g., FIG. 1) closing off the roof top opening and at least an open sunroof position (see FIG. 13). This top preferably has the substantially identical side appliques 32 with the longitudinal 35 sealing groove as described previously and incorporated here.

An intermediate link 78 is operably rotatably connected to the first link 50 at first joint 64. The intermediate link 62 is operably rotatably connected to the second link 60 at second joint 66. The end of the intermediate link incorporates a mounting bracket 60, preferably, an integrally formed bracket 80 protruding element 68 operably connected to the bow 46 (e.g., welded, fastened by at least one fastener, etc.). FIG. 13 has the bow 46 omitted for clarity in the view, while FIG. 14 depicts the bow 46 connected to the bracket 80. Preferably, the assembly 10 is an insert adapted to connect to the vehicle 12 at a roof top opening.

Figure 16:
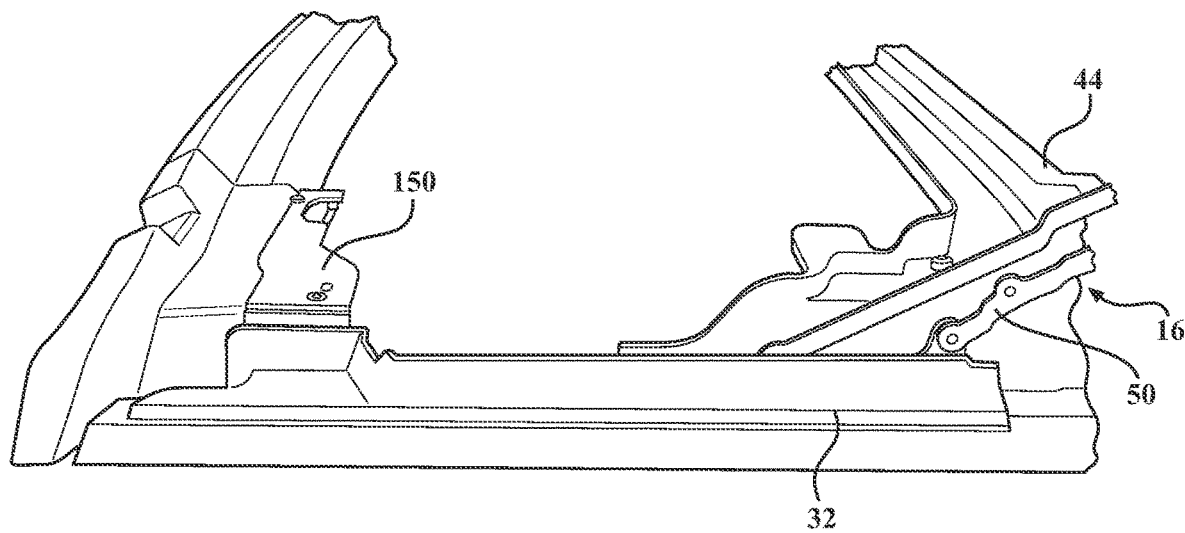
FIG. 16 is a perspective view of the soft top cover assembly, according to aspects of the present invention.
Figure 17:
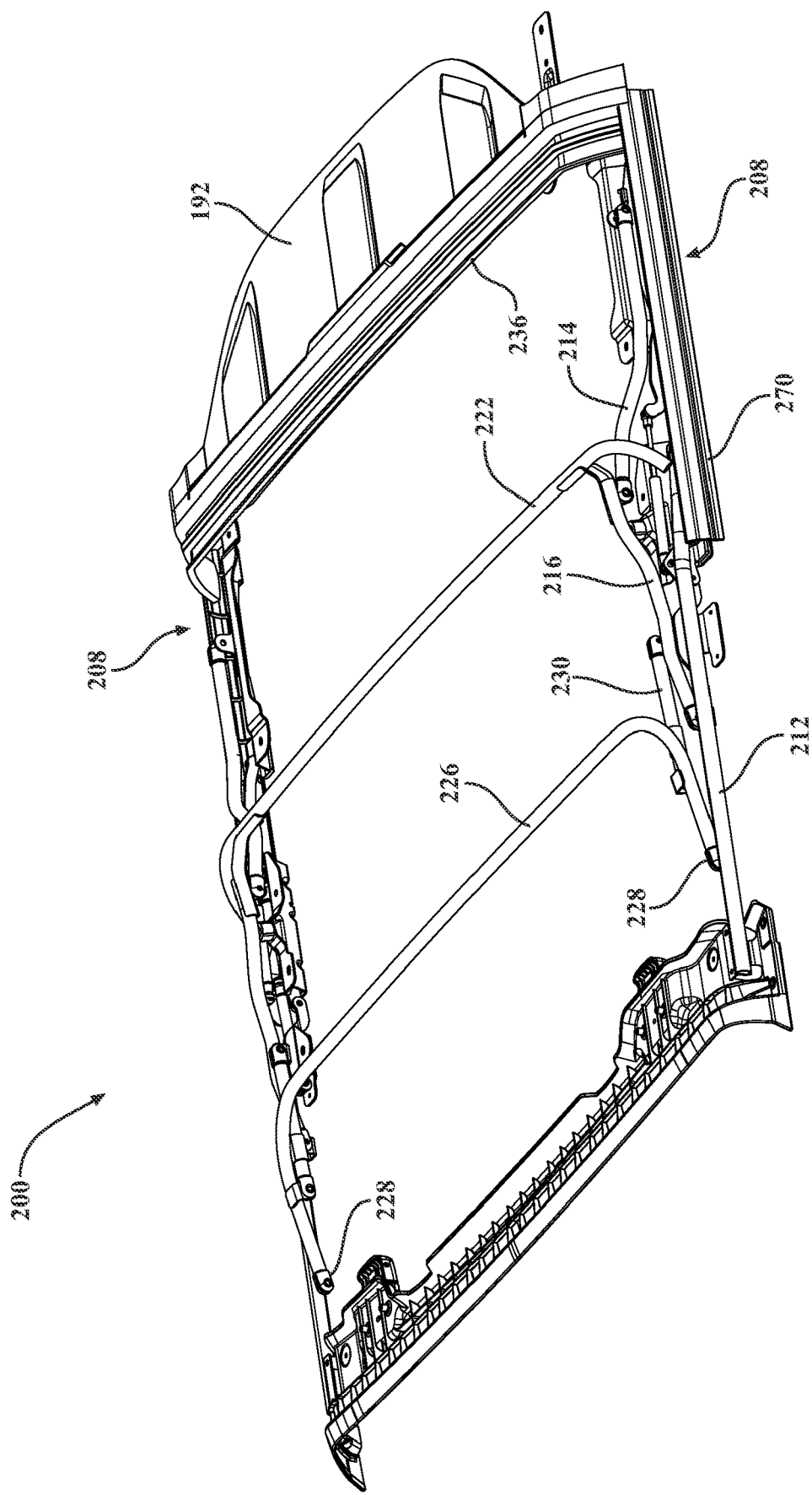
FIG. 17 is a perspective view of the soft top cover assembly depicted in a closed position, in accordance with the present invention.
Figure 18:
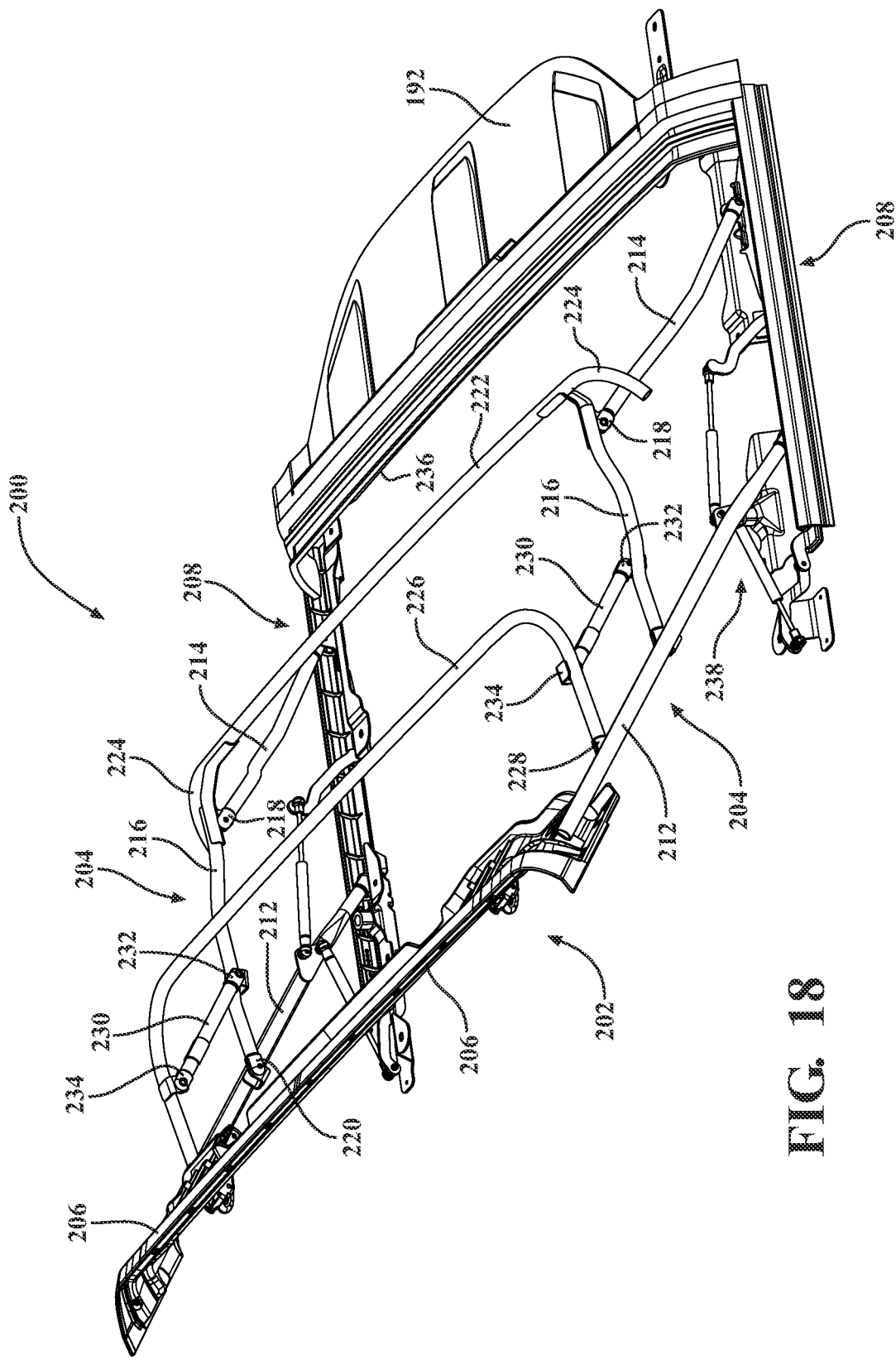
FIG. 18 is a perspective view of the soft top cover assembly depicting the top in the process of rotating back toward an open position, in accordance with the present invention.
Figure 19:
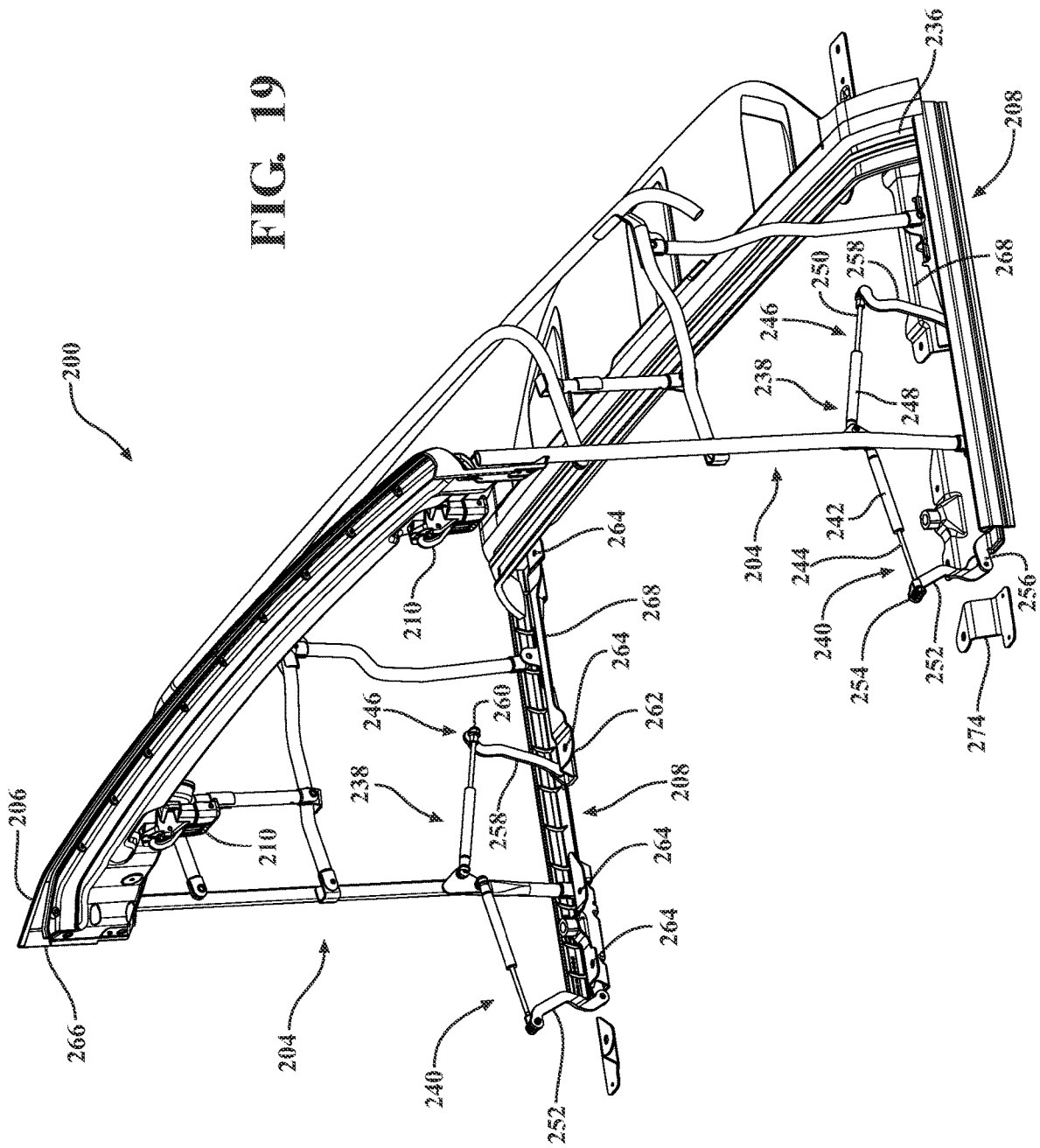
FIG. 19 is a perspective view of the soft top cover assembly depicting the top further rotated back toward the open position, in accordance with the present invention.
Figure 20:
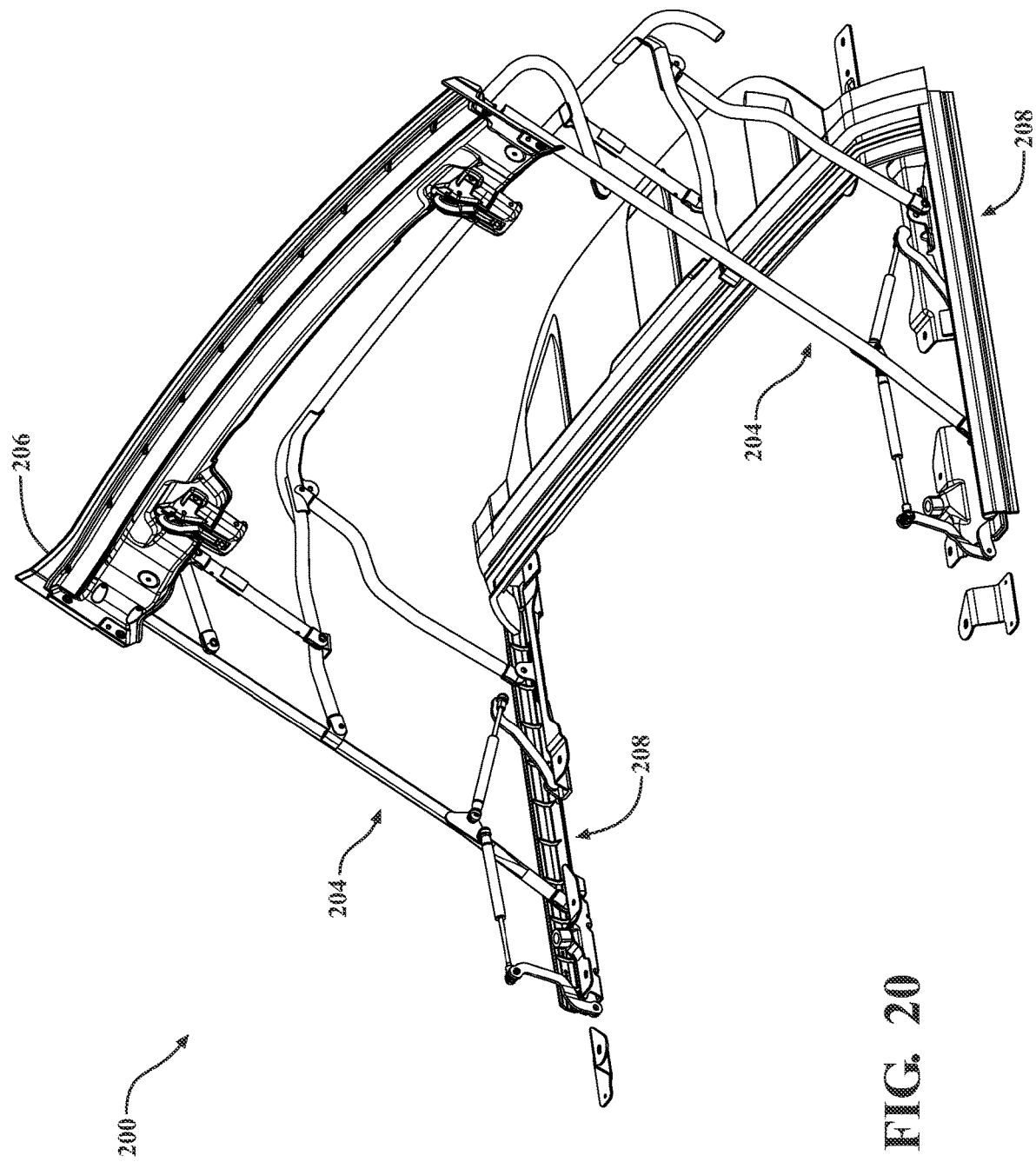
FIG. 20 is a perspective view of the soft top cover assembly depicting the top in the process of further rotating back toward the open position, in accordance with the present invention.
Figure 21:
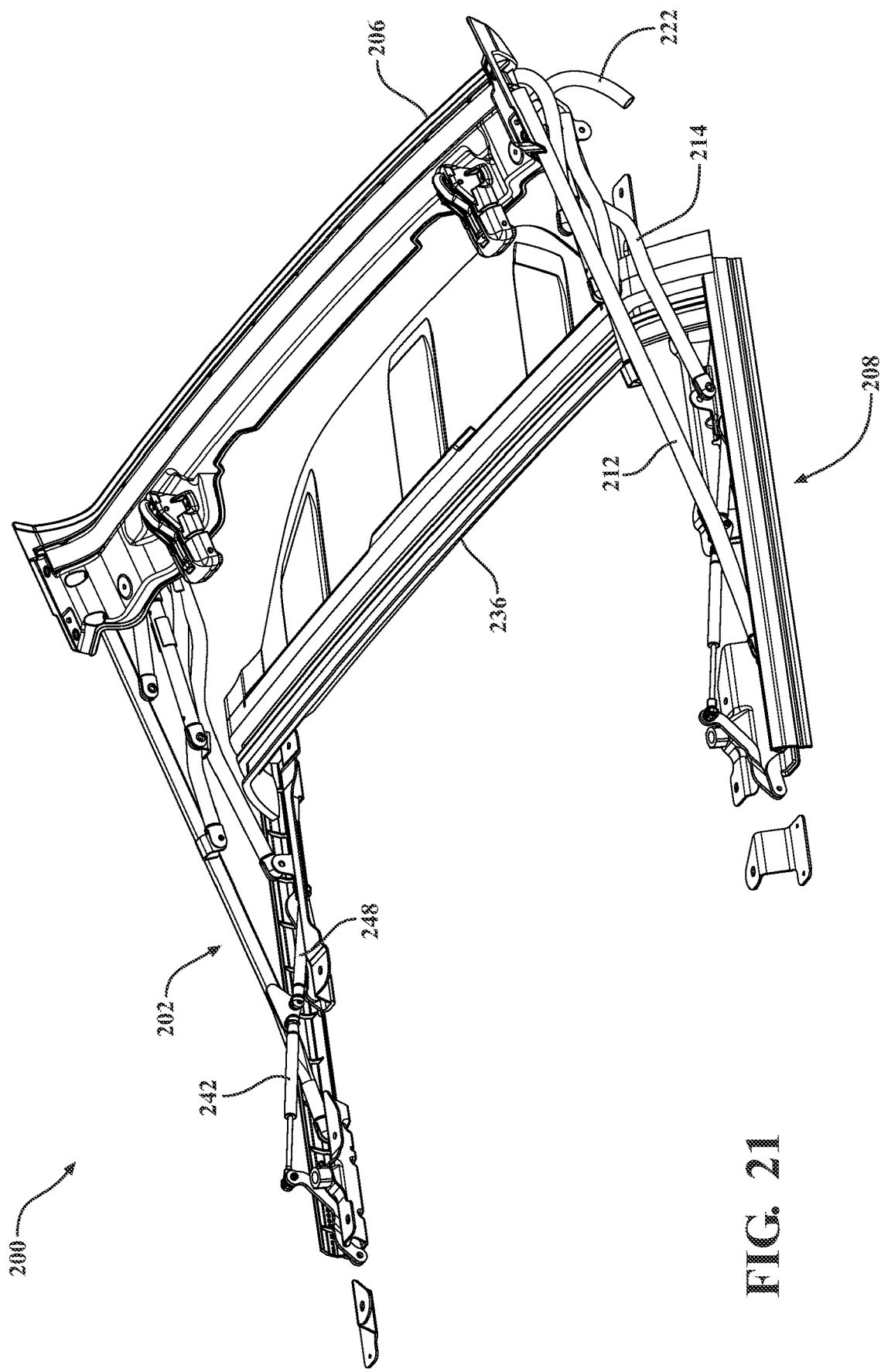
FIG. 21 is a perspective view of the soft top cover assembly depicted in the exemplary open position, in accordance with the present invention.
Figure 22:
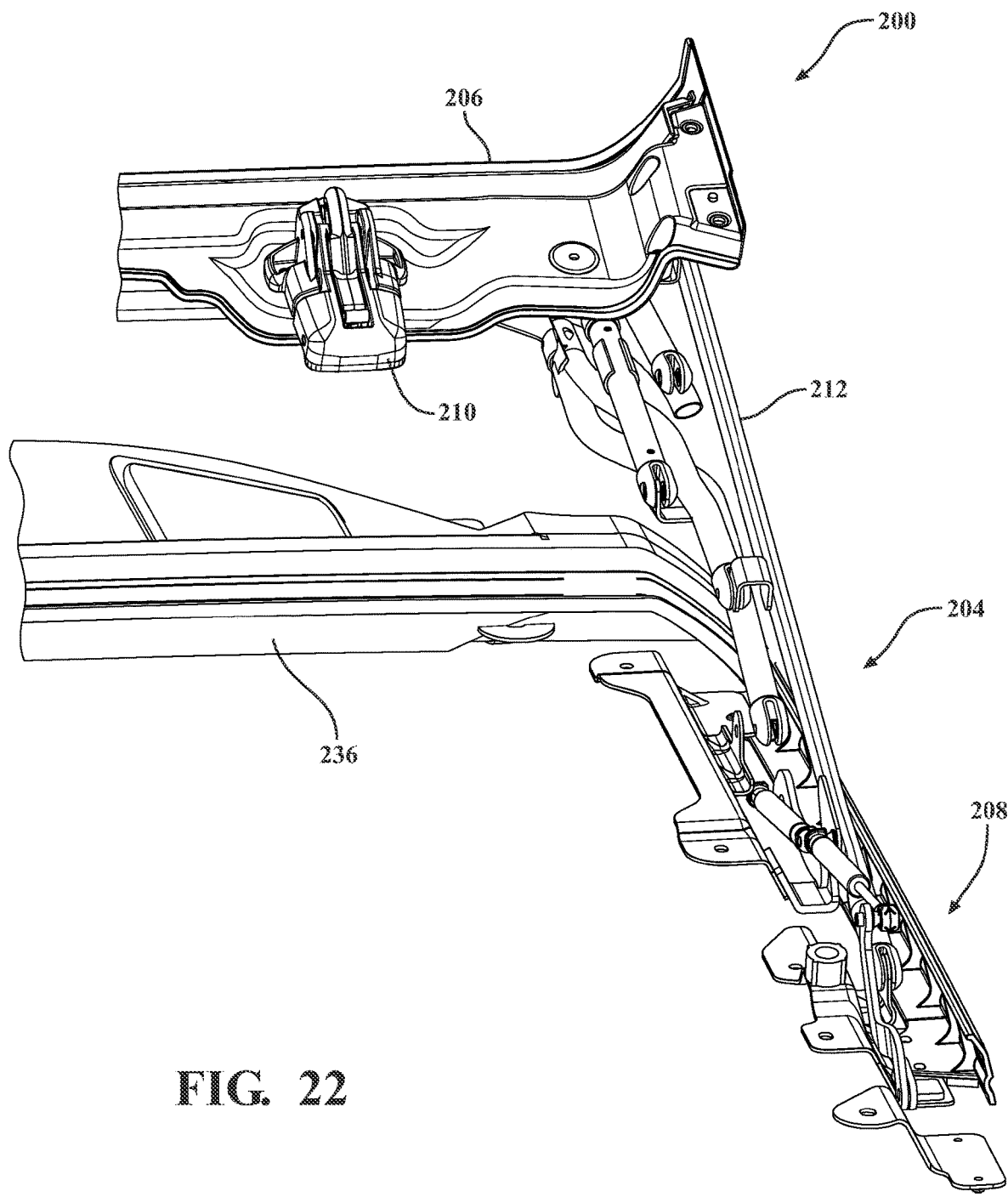
FIG. 22 is a front perspective view of the soft top cover assembly depicted in an exemplary open position, in accordance with the present invention.
Figure 23:
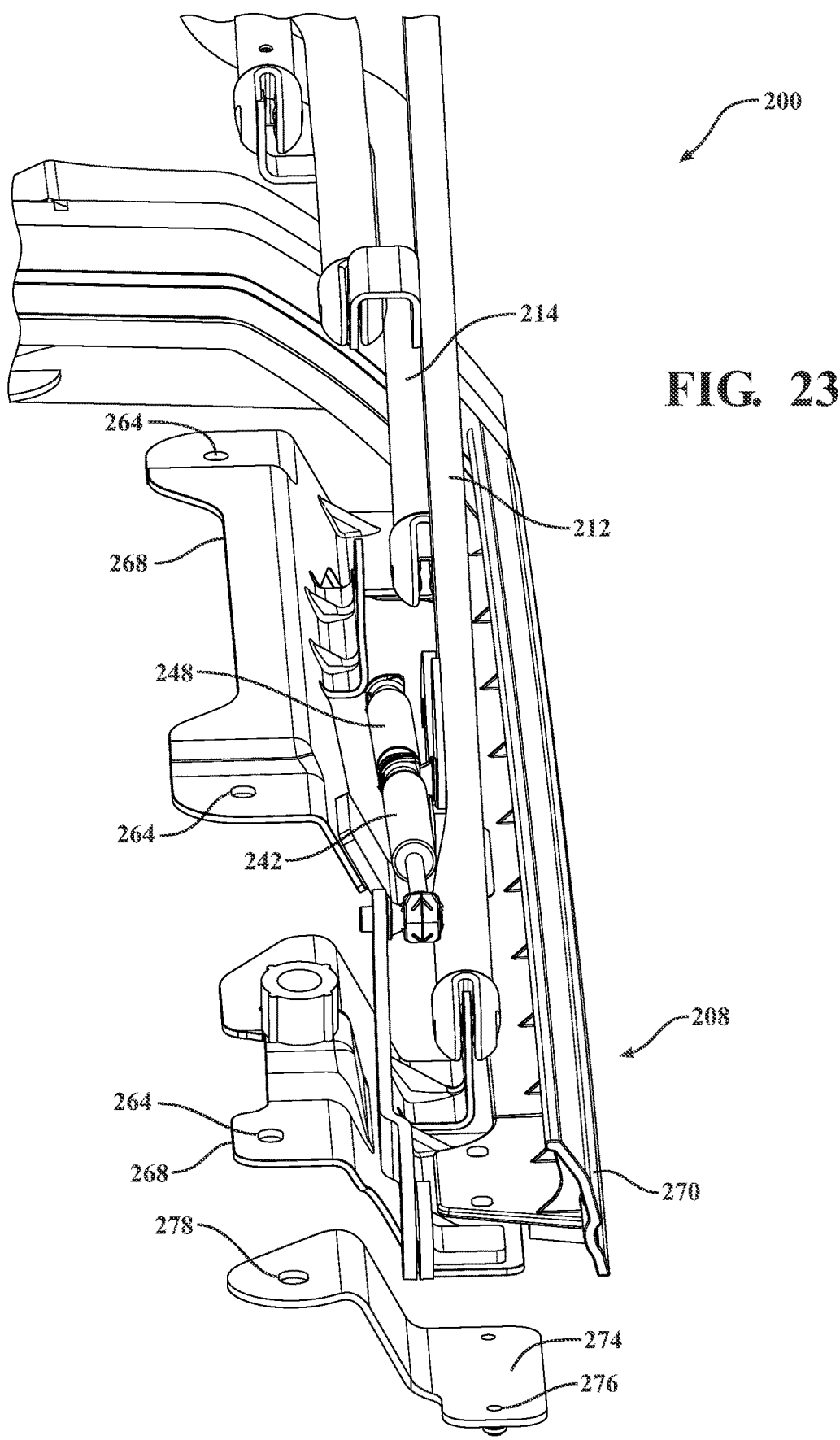
FIG. 23 is a front perspective view of the soft top cover assembly depicted in an exemplary open position in an environment of use, in accordance with the present invention.

Referring more particularly to FIG. 16, according to aspects of the present invention, a mounting bracket 150, e.g., metal part, can be used and is adapted to connect a forward end of each side appliques 32 to the vehicle.

Referring more particularly to FIGS. 7-12 and 39 there is provided a soft top cover assembly shown generally at 100 adapted for a vehicle (e.g., SUV, 5-door SUV etc.) that opens over at least the occupant compartments (e.g., front and rear compartments) and is adapted for attaching to the vehicle and has a plurality of removeable windows in the back. This top preferably has the substantially identical side appliques 32 with the longitudinal 35 sealing groove as described previously and incorporated here. The top also has side tensioning members for drawing the top into the sealing groove when closed.

Preferably, there is provided as least one additional applique 32a, most preferably, a plurality of additional appliques 32a and 32b (e.g., three total appliques per side). These appliques 32a and 32b may be similar as described as to applique 32 but are operably adapted to attach in rearward sections. Alternatively, along roll bars when present, by way of non-limiting example. Optionally, at least the appliques 32a and 32b are integrally formed or pre-assembled as a single piece. The appliques 32, 32a, 32b can be made as aluminum or plastic extrusions, stamped mill steel, cast or any other suitable material(s) and combinations thereof. Alternatively, door rails are provided for rear passenger compartment and/or rear carrier compartment.

The top 100 incorporates at least one front header 44 adapted to selectively attach to the vehicle (e.g., to windshield frame with latches). The cover 34 is operably connected to the front header 44 (e.g., with a plurality of fasteners). Linkage assemblies are operably connected toward both ends of the header 44. The assembly 100 includes at least one second bow 112 and at least one rear bow 114, e.g., a fabric management bows operably listed or connected to a fabric cover 34. Preferably, at least one additional rear bow 115 is provided substantially adjacent a rear window opening indicated generally at 117.

The assembly 100 closes off a roof top opening of the vehicle and is adapted to operably connect to the vehicle. A pivotal portion 116 with linkage assemblies 118 rotates the cover to open the roof top opening when an open-air experience is desired, or to close off the roof top opening when desired.

Figure 30:
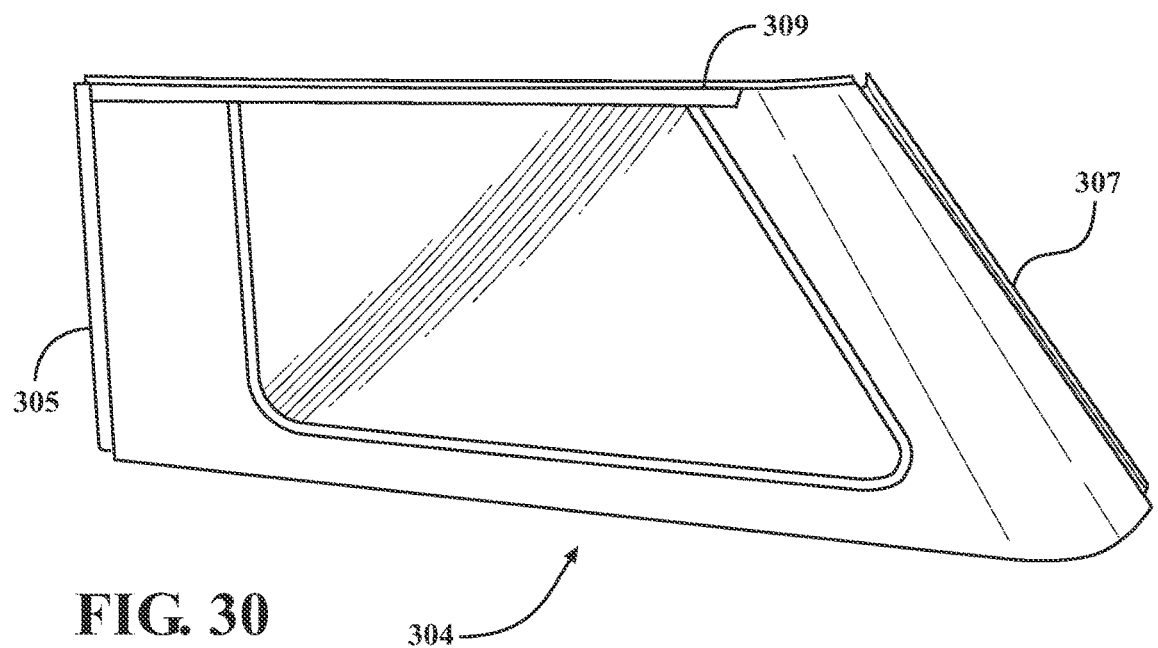
FIG. 30 is a perspective view of a rear side window in an environment of use, in accordance with the present invention.
Figure 31:
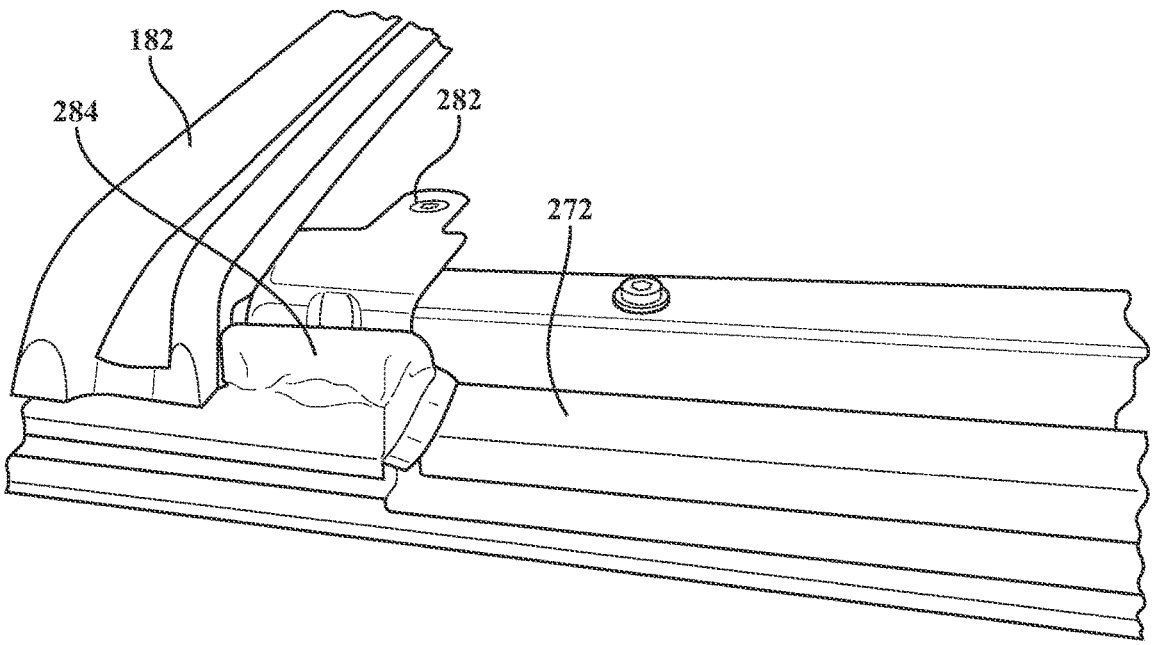
FIG. 31 is a perspective view of a shut face applique in an environment of use, in accordance with the present invention.
Figure 32:
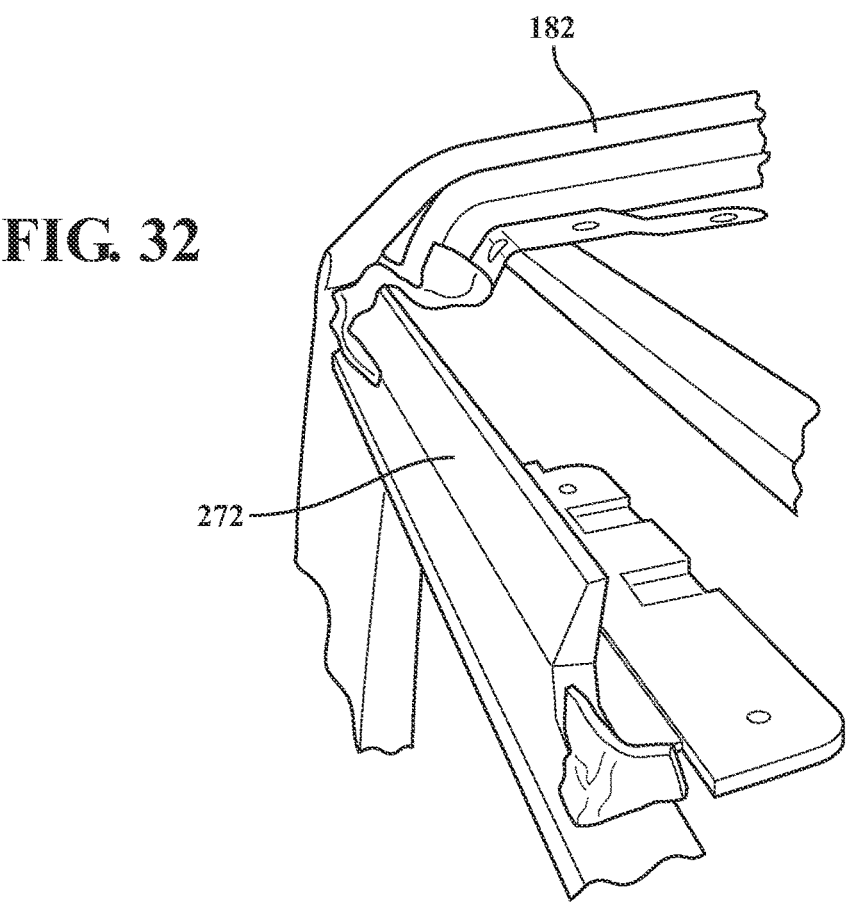
FIG. 32 is a rear perspective view of the shut face applique in the environment of use, in accordance with the present invention.
Figure 33:
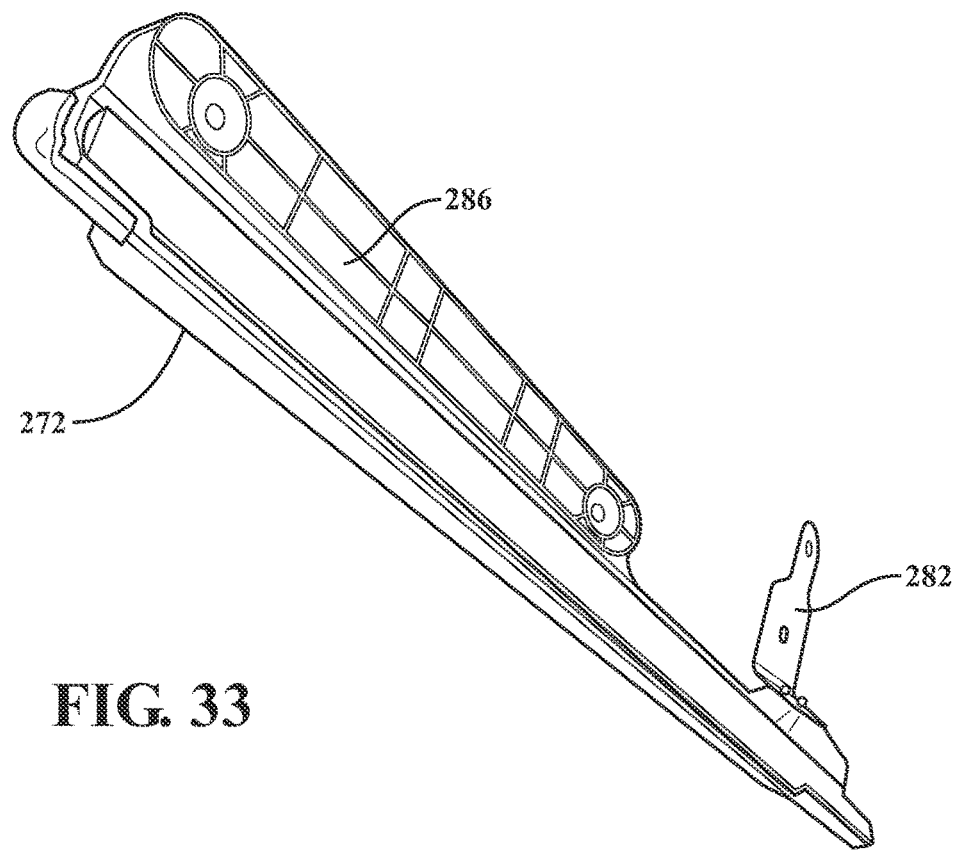
FIG. 33 is a perspective view of the shut face applique, in accordance with the present invention.
Figure 34:
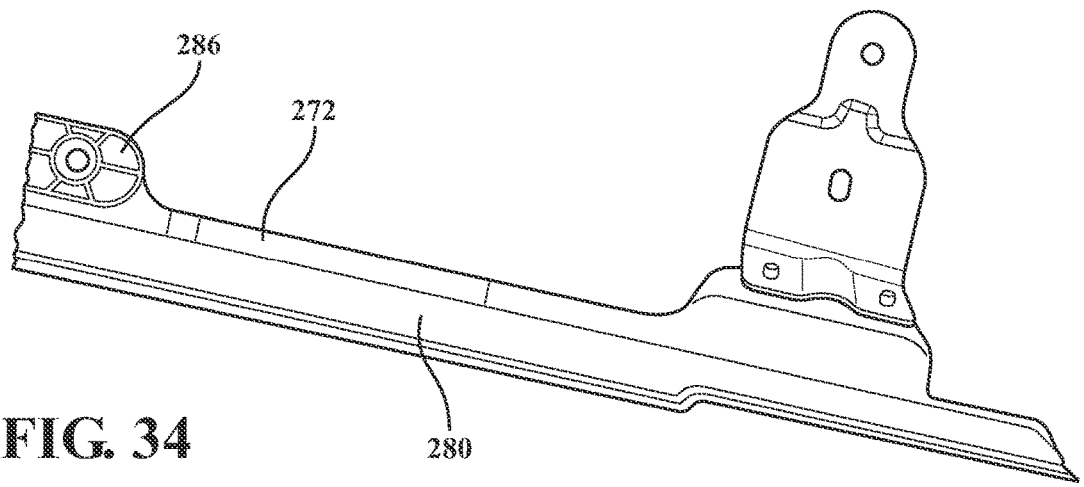
FIG. 34 is a perspective view of the shut face applique, in accordance with the present invention.
Figure 35:
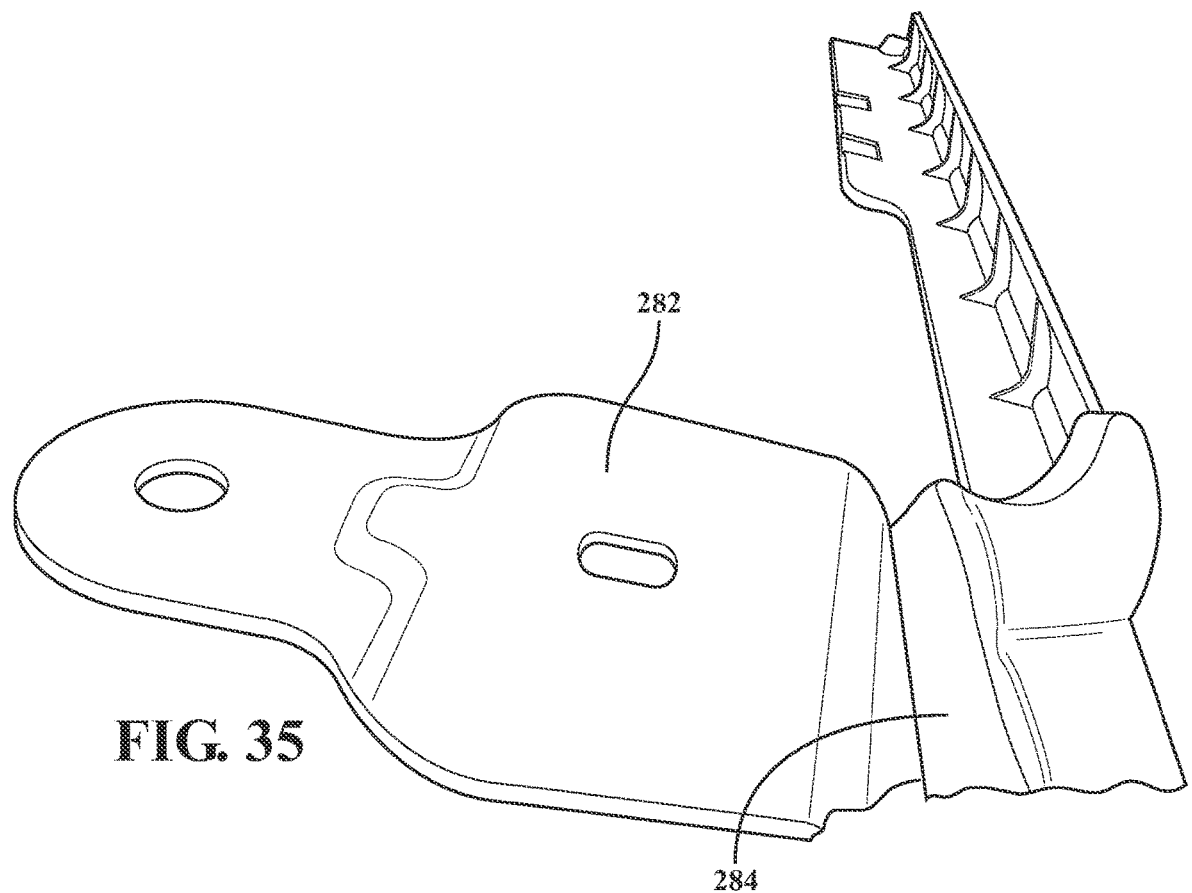
FIG. 35 is a perspective view of the shut face applique, in accordance with the present invention.

A rear corner piece 120 (or "rear hard corner trim") in each rear corner of the assembly 100 is adapted to form opposite rear hard corners and connect to mounting features adapted to operably connect to the vehicle. Each rear corner piece 120 is preferably at least one molded piece. Alternatively, a plurality of molded pieces operably connected together. The rear corner piece 120 is operably adapted to abut a rear window in weathertight engagement. A rear side window (e.g., rear side window 304 depicted in FIG. 30) is operably coupled to the rear corner piece 120 (e.g., retention portion 307 on the rear side window 304 depicted in FIG. 30 is operably coupled to the rear corner piece 120 such as wrapped over the outside surface and held in a grove formed in the piece 120), and, optionally, the rear side window is selectively removable when a more open air experience is desired.

A retention member is indicated generally at 122 or "first mount" or "rear corner mount." The retention member 122 is adapted to operably attach to the vehicle, e.g., at oppositely-disposed rear corners/sides of the vehicle indicated at 123. The retention member 122 is a plurality of pieces, e.g., metal stamped and/or molded pieces, operably connected together and adapted to connect to the vehicle, or, alternatively, a single formed piece. By way of non-limiting example, at least a first portion 132 operably connected to, preferably by at least one fastener, to at least a second portion 134, which is operably connected to, preferably by at least one fastener, to at least a third portion 136. The second portion 134 is adapted to connect to the vehicle, preferably, with at least one fastener. The first and second portions 132,134 generally disposed near the rear corner 123 of the vehicle adjacent a rear door opening into the vehicle, and the third portion 136 generally disposed on the sides 123 of the vehicle adjacent the rear side windows 304. The third portion 136 is adapted to operably connect to the vehicle (e.g., to upper side walls of the tub or cargo area of the vehicle substantially behind the passenger compartment). At least one, preferably, at least two, attachment portions 138 on the third portion each include at least one aperture 140 to connect the third portion to the vehicle with at least one fastener.

Each rear corner piece 120 goes into place by placing the rear corner piece 120 in the attachment member 122, such as an attachment feature 125 (e.g., a tab, snap, detent tab, or any suitable locking feature) into an aperture 129 of the attachment member 122 and then rotating the corner piece 120 into a second mount 124 (e.g., an upper mount 124). The second mount 124 is preferably operably coupled to a bow of the assembly (e.g., rear bow 115, adapted to operably connect to the vehicle, etc.) and securing part of the corner piece 120 (e.g., the upper portion of the piece 120) with at least one mounting tab 126 or fastener 126 to at least one receptacle 128, hole, opening, receptacle recess, slot, or groove (e.g., a bolt, mechanical fastener, snap fit, corner piece 120 pin selectively releasably snapped into second mount 124 receptacle 127, etc.).

Most preferably, the attachment member 122 is adapted to operably connect to the vehicle, preferably, adapted to connect to an inner fender body frame portion of the vehicle. Preferably, the attachment member 122 is adapted to operably connect to the vehicle advantageously to allow selective removal of an outer fender body frame portion of the vehicle. It is understood that the attachment member 122 is operably adaptable for use with any aspects of the present invention depending on the application without departure from the scope of the present invention.

According to aspects of the present invention, a side window trim (e.g., identical to attachment trim 302 of FIG. 29) operably provides for attachment for the side window retainer 305 (e.g., front attachment using substantially vertical grooves in 130 of front edge attachment member 302 for retainer 305 of FIG. 30). Preferably, the window 305 is adapted to connect to a bottom attachment feature, e.g., belt rail groove 132 for rear side window attachment. By way of example, a recess or groove is operably provided in at least the third portion 136 to receive a retainer, e.g., J-hook retainer, for side window attachment. The top of the rear side window 305 is adapted to operably connect to the vehicle. Preferably, a top retainer 309 of the rear side window 305 is operably selectively connected to the door applique 32 or a molded rail 32b. It is understood that alternative attachment is contemplated adapted for the particular vehicles without departure from the scope of the present invention.

There is at least one connection piece (e.g., cable, retainer, etc.) for tensioning the fabric to the bow (e.g., rear bow) and the tension of the fabric holds each rear corner 120 into the mounts 122/124 and gives the assembly a tight corner look.

Most preferably, there is a selectively freely rotating front bow 44 on this top.

It is understood that the right side is substantially a mirror-image of the right side.

The present invention is adapted for attachment to a sport utility vehicle or any other vehicle.

Referring more particularly to FIG. 17-36, there is provided a soft top cover assembly shown generally at 200 ("assembly") adapted for attachment to a vehicle 178 (e.g., SUV, 5-door SUV, 2-door, 4-door, 5-door, substantially vertical back, slant back, 2-door slant back, 4-door slant back, about 45 degree slant back, etc.) that opens over at least one occupant compartment to uncover a roof top opening indicated generally at 180, and moves to a closed position to close off/cover the roof top opening. By way of non-limiting example of an environment of use, the vehicle includes a windshield frame 182, upper side members 184 generally extending back from both sides of the windshield frame generally at a roof opening or no side members and openings for the vehicle driver/passenger doors, at least a front passenger compartment indicated generally at 186, optionally, a rear occupant compartment indicated generally at 188, and at least one cross member 190 disposed opposite to the windshield frame generally at the roof opening. By way of non-limiting example of an environment of use, the at least one cross member is substantially behind or above the rear passenger compartment seating generally at the roof opening opposite to the windshield frame, with upper side members, e.g., frame, horizontal structure, extending generally from the windshield frame upper to the cross member. It is understood that the assembly 200 is operably adaptable for attachment to any predetermined vehicles, e.g., various SUV 2-dr, 4-dr, 5-dr, production or after-market, etc., without departure from the scope of the present invention. FIG. 36 depicts a non-limiting exemplary environment of use.

A top filler panel 192 is adapted to operably couple to the vehicle. The top filler panel 192 generally follows the curvature of the rear header 236 and, optionally, is adapted to generally follow the curvature of the rear roof top opening portion. Typically, the top filler panel 192 is adapted to operably connect at a roof top opening portion of the vehicle, e.g., rear top opening area generally adjacent the rear of the vehicle. Preferably, the top filler panel 192 includes at least one edge portion adapted to operably connect to the vehicle, most preferably, using at least two brackets each adapted to connect to the vehicle with at least one fastener. The top filler panel 192 is operably connected to the rear header 236, e.g., with a plurality of fasteners, mechanical fit, adhesive, etc. and any other suitable connection and combinations thereof). Alternatively, the top filler panel 192 is integrally formed as one piece with the rear header 236. It is understood that the top filler panel 192 is operably adaptable for combination with any of the assemblies of FIGS. 1-37 depending on the application without departure from the scope of the present invention.

FIGS. 17-23, for example, depict the assembly 200 operably adapted for attachment to a 4-door sport utility vehicle. FIGS. 31-36, for example, depict side appliques operably adapted for attachment to a 2-door vehicle and 4-door and 5-door vehicles. Although, it is understood, that either are adaptable for any vehicle, e.g., 2-dr, 4-dr, 5-dr, slanted back, generally vertical back, etc., within the scope of the present invention.

Referring generally to FIG. 17-35, the assembly 200 is adapted for sealing engagement at the roof top opening, such as to a roof top like a hard top roof portion. Optionally, the assembly 200 is adapted to abut against at least one seal of the roof top, e.g., a hard top seal. Optionally, the assembly 200 includes at least one seal, e.g., lip seal, foam, bulb, etc., and any combinations thereof, suitable to provide a weatherproof seal toward the rear of the assembly. The assembly 200 is adapted for operable sealing engagement to the vehicle, such as at the windshield frame, e.g., compressed to a bulb seal connected to the windshield frame. The assembly 200 is adapted for sealing engagement to the vehicle, such as at both sides adjacent the roof top opening, e.g., compressed to crosslinked foam or other suitable provided on the assembly adapted to compress to the vehicle, and/or foam or other suitable seal on the vehicle to which the assembly is adapted to compress, e.g., on at least one location on both upper side members.

The assembly 200 is adapted to operably connect to the vehicle and selectively cover and selectively uncover a roof top opening of the vehicle. The assembly 200 includes a pivotal portion shown generally at 202 operably connected to the cover material and including a pair of pivotal linkage assemblies shown generally at 204 and a first bow member 206 connected between the pivotal linkage assemblies 204, 204. Rotating the pair of pivotal linkage assemblies 204 rotates the cover, e.g., fabric, soft top material, sail, twill, etc., to uncover the roof top opening 180 when an open-air experience is desired. The linkage assemblies are adapted to be operably secured to oppositely-disposed sides of the roof top opening. By way of non-limiting example, each adapted for pivotally coupling to at least one side rail applique shown generally at 208. It is understood that the top is adaptable depending on the application or any alternative attachment, e.g., pivotally connected to brackets on the vehicle, operably pivotally connected to sport bars, pivotally connected to rollover structure, or, alternatively, to a door rail, etc. and any combinations thereof. FIG. 2 and the previous description are incorporated here in entirety as an example of one preferred applique and arrangement.

Preferably, the assembly 200 is adapted to attach to the vehicle at the roof top opening to allow uncovering/covering of all passenger compartments, e.g., substantially uncover the front and rear seating when the top is flipped/rotated back.

The front bow member 206 is adapted to selectively connect to the vehicle when the top assembly is in the closed position using at least one attachment mechanism 210, at least two paddle latches, at least two rotary latches, cams, etc. The first bow member is adapted to operably connect between the pivotal linkage assemblies 204, preferably, the linkage assemblies 204 including at least one rail operably connected to the member 206, e.g., fixed connection to the header 206. Optionally, the first bow member 206 carries at least one seal 266.

The assembly 200 includes at least two side appliques 208 adapted to be operably connected to the vehicle, e.g., at oppositely-disposed sides of the roof top opening. Preferably, each applique 208 is adapted to operably attach to the side members 184 of the vehicle. It is understood, however, that the appliques 208 are adaptable to connect to any predetermined surface(s), including, but not limited to, a rear halo of the assembly 200, and/or at least one cross member, etc. Preferably, the appliques include at least one attachment bracket adapted to connect to the vehicle with a plurality of fasteners, e.g., threaded bolts, knob-type fasteners, etc.

The linkage assemblies 204 each include a plurality of rails. A first rail 212, e.g., front rail, is adapted to secure at the side of the roof top opening. The first bow member 206 is secured between the first rails 212,212 at one end of each first rails 212,212. At the other end, the first rails 212,212 are adapted to operably pivotally secured at the side of the roof top opening. Preferably, to the side applique 208, e.g., to a rear side applique. Preferably, in accordance with an aspect of the present invention, the rails 212 having a predetermined longer length for the top to go over both front and rear seating.

The assembly 200 includes a plurality of intermediate linkage members.

A second rail 214, e.g., rear rail, is adapted to secure at the side of the roof top opening. Preferably, pivotally connected at one end to the side applique 208, e.g., to a rear side applique. At the other end, each second rail 214,214 is respectively operably connected to a first intermediate linkage member 216.

The pivot points for the first and second rails 212,214 pivot are via attached to brackets adapted to connect to vehicle (or bracket(s) that is/are part of the top assembly 200, e.g., shutface appliques, etc.

Figure 24:
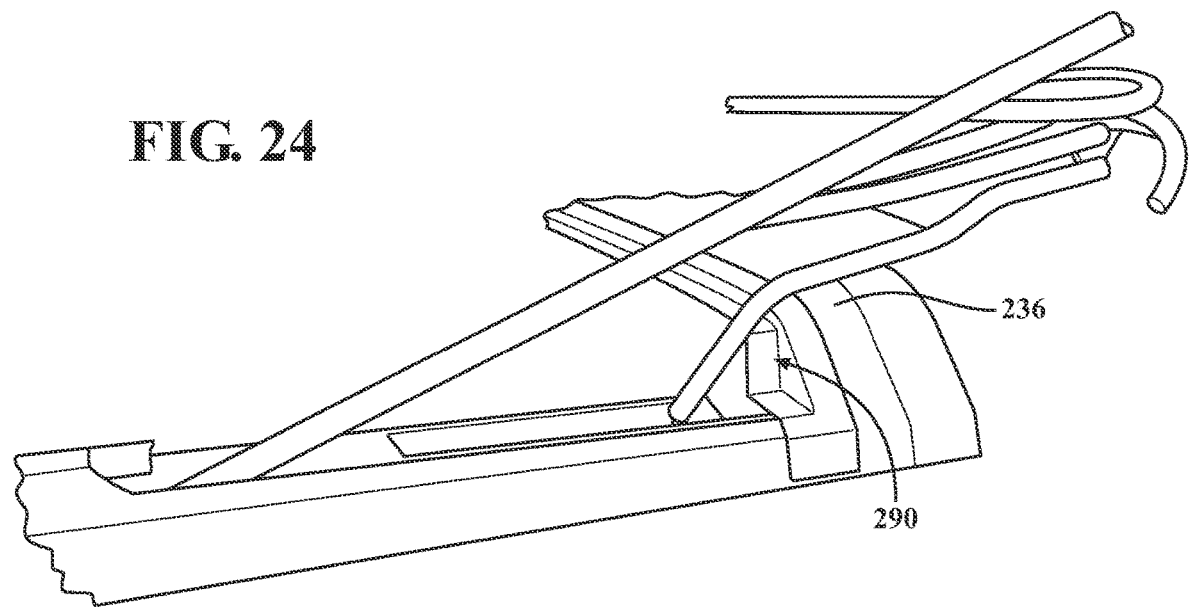
FIG. 24 is a front perspective view of the soft top cover assembly with a roof-clearing curved rail in an environment of use, in accordance with aspects of the present invention.
Figure 25:
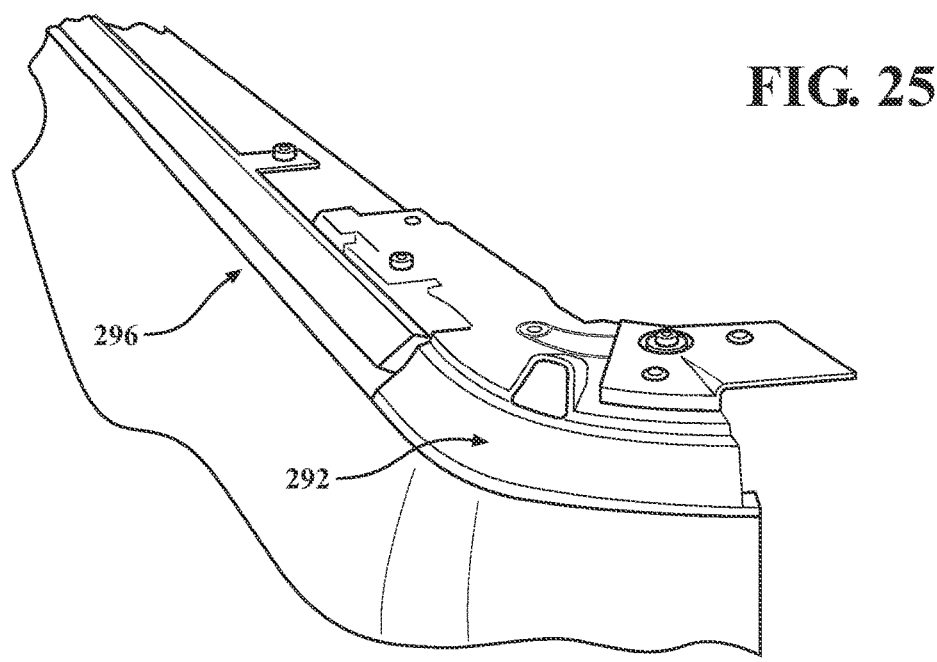
FIG. 25 is a perspective view of a lower corner mount and lower side rail in an environment of use, in accordance with the present invention.
Figure 26:
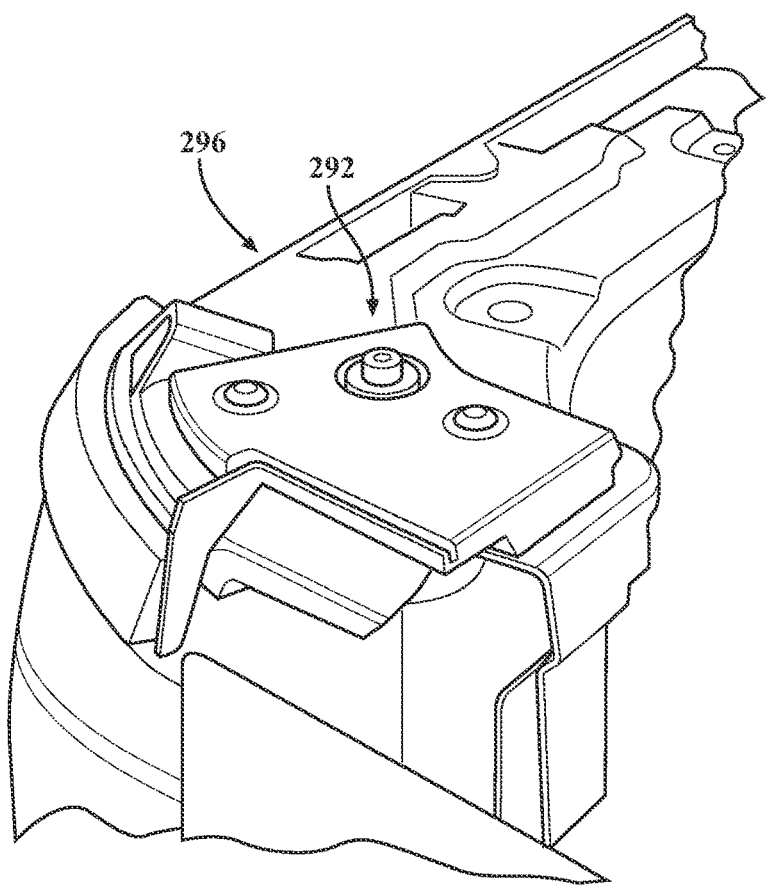
FIG. 26 is a rear perspective view of the lower corner mount and lower side rail in the environment of use, in accordance with the present invention.
Figure 27:
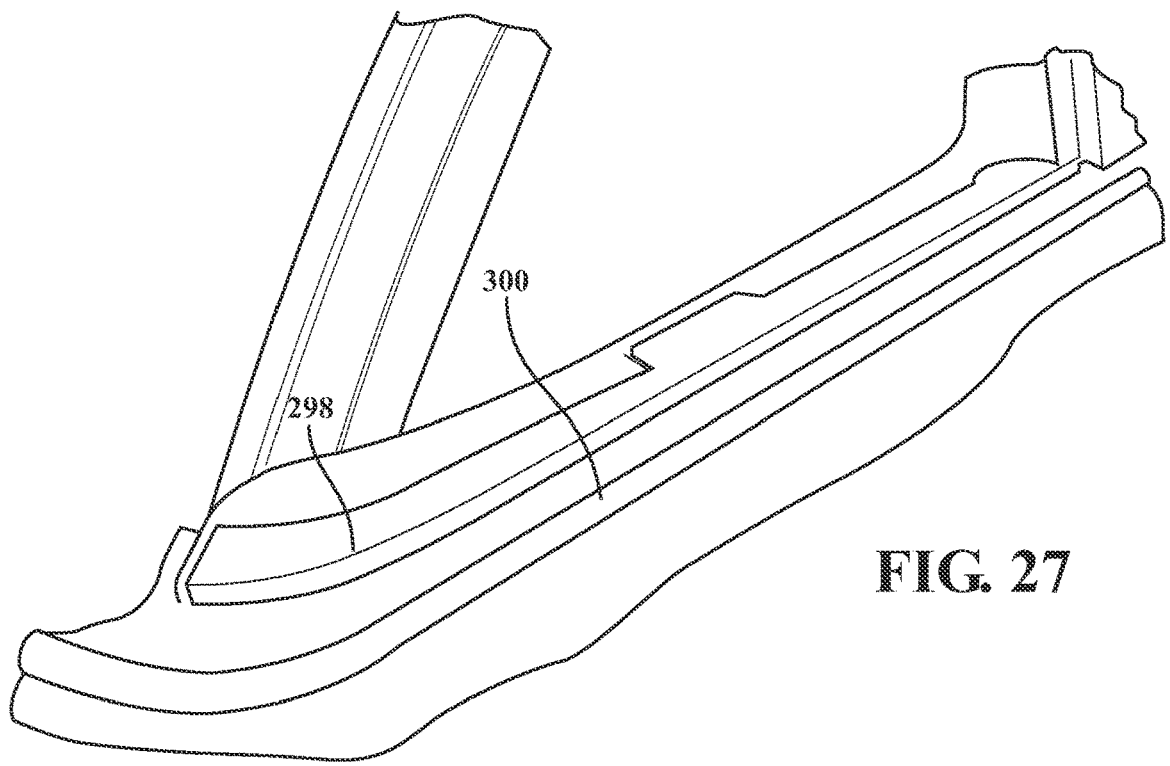
FIG. 27 is a rear perspective view of the lower corner mount and lower side rail in the environment of use, in accordance with the present invention.
Figure 28:
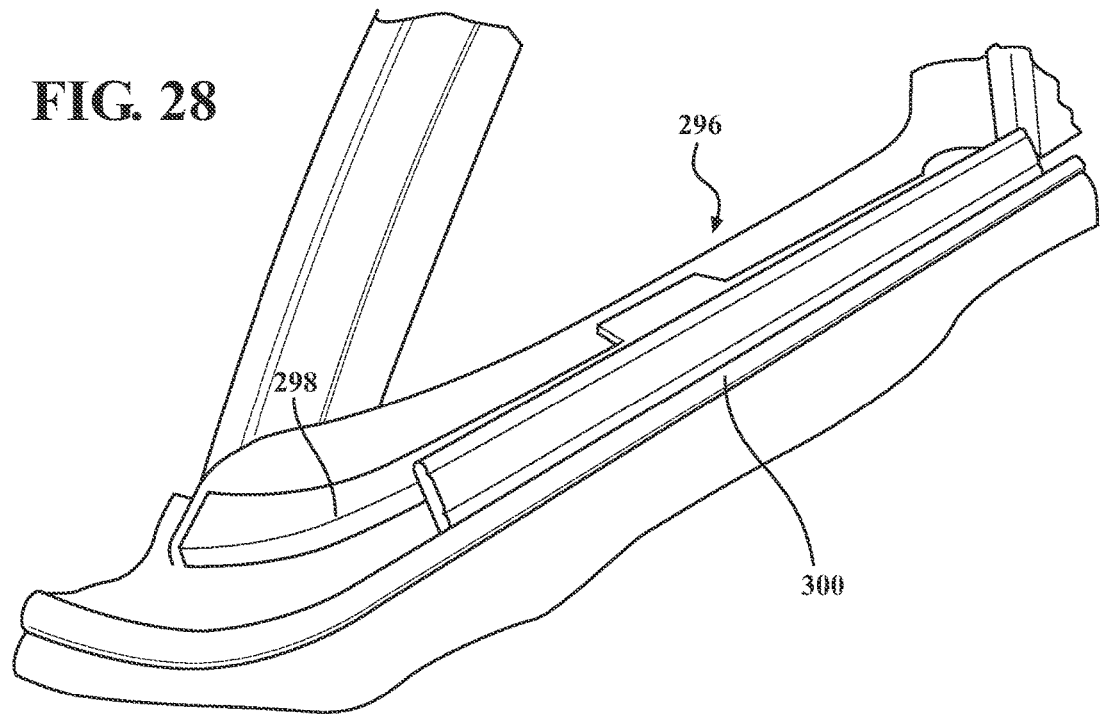
FIG. 28 is a rear perspective view of the lower corner mount and lower side rail in the environment of use, in accordance with the present invention.

At least the second rails 214 can incorporate predetermined curvature to help clear the rear header 236. FIG. 24 illustrates an example of a curved portion 290 to set help set the height of the rail 214 to be above the top of the halo 236.

The intermediate linkage member 216 is connected toward the other end to the respective first side rail 214. The 216 connections may be at pivot joints 218,220 to the second rail 214 and first rail 220, respectively.

Each intermediate linkage member 216 is also connected to a second bow member 222, e.g., rear bow member. The second bow member 222 is operably connected substantially between the pair of intermediate linkage members 216,216, to extend cross car. The connections are preferably fixed. Both ends 224 of the second bow member preferably extend further outboard from the connection point to the intermediate linkage members 216 and are preferably curved to assist with cover management, e.g., the top deck side edge profile when the top is in the closed position. The second bow member 222 is operable to assist with predetermined fabric management. By way of non-limiting example, to assist in folding the cover in substantially an accordion-like fashion when opening/open, and operably assisting to tension the cover when closing/closed.

Each first rail 212 is also connected to a third bow member 226, e.g., intermediate bow member. The third bow member 226 is operably connected between the pair of first rails 212,212, to extend cross car. The connection at both ends of the third bow member 226 to the first rails 212 is preferably pivotal at joint 228. The third bow member 226 is operable to assist with predetermined fabric management. By way of non-limiting example, to assist in folding the cover in substantially an accordion-like fashion when opening/open, and operably assisting to tension the cover when closing/closed.

A second intermediate linkage member 230 is operably connected at one end to the intermediate linkage member 216, e.g., pivotally connected at joint 232. The second intermediate linkage member 230 is connected at the other end to the third bow member 226, e.g., pivotally connected at joint 234.

Rotating the first and second rails 212,214 are rotated back uncovers the roof top opening 180 and rotating them forward covers the roof top opening 180.

The assembly 200 also includes a rear header 236 or rear halo. The rear header 236 is adapted to connect at the roof top opening opposite to the windshield frame 182. By way of non-limiting example, at least two attachment brackets and/or at least two fasteners, etc. (e.g., threaded bolts, threaded knob fasteners, rotary latches, cams, mechanical interfaces, etc. and any combinations thereof) are adapted to selectively attach the rear header 236 to the vehicle, e.g., a vehicle crossmember, side members, rear members, pillar, C-Pillar, etc. and any combinations thereof). Preferably, the rear header 236 is adapted to abut a roof top, e.g., hard top portion of the vehicle, to allow sealing engagement to the roof top. Preferably, each applique 208 is adapted to operably connect to the rear header 236.

By way of examples, the rear header 236 can be a 3-bar rear halo. Integrally formed halo. Multi-piece halo. Three molded pieces operably connected together. A halo/side shutface appliques insert.

The cover at least partially covers an upper surface of the first bow member 206 and rear header member 236. Preferably, wrapping around a front edge of the bow 206 and operably connecting to the underside of the bow 206, e.g., using a retainer, sandwiched between panels, snaped, sewn, adhered, riveted, etc. and any combinations thereof. The rear edge of the cover is operably secured to the rear header 236 e.g., using a retainer, sandwiched between panels, snaped, sewn, adhered, riveted, etc. and any combinations thereof.

Each linkage assembly 204 preferably includes a lift assist mechanism generally shown at 238. The lift assist mechanism 238 includes a first assist generally indicated at 240, e.g., a gas cylinder 242 and actuation shaft 244, and a second assist generally indicate at 246, e.g., a second gas cylinder 248 and a second actuation shaft 250. Preferably, the assists 240,246 are compressed air type pneumatic cylinder body types. These assists 240,246 are operably connected at one end, respectively, to the first rail 212 in force opposition, such that when the first rail 212 is down in the closed position, one assist 240 or 246 is extended while the other is compressed, and vice versa when the first rail 212 is rotated back to the open position. The other end of the assists 240,246 are adapted to secure to oppositely-disposed sides of the roof top opening. Preferably, a first link 252 is operably connected to the first assist 240 at one end, e.g., pivotally connected at joint 254, said link operably connected at the other end to the side applique 208, e.g., pivotally connected at joint 256, or any other suitable predetermined location or part. Preferably, a second link 258 is operably connected to the second assist 246 at one end, e.g., pivotally connected at joint 260, said link operably connected at the other end to the side applique 208, e.g., pivotally connected at joint 262, or any other suitable predetermined location or part. The respective applied force to the first rail 212 while rotating between closed and open positions assists the linkage assemblies 204,204 in opening and closing.

It is understood that, alternatively, the assembly 200 does not have lift assists without departure from the scope of the present invention.

Preferably, the side applique 208 incorporates a plurality of apertures 264 through attachment members 268, (e.g., formed in attachment members integrally formed with the side applique such as molded plastic appliques, or formed through brackets such as metal brackets operably connected to the side appliques), the apertures adapted to secure the side appliques 208 to the vehicle.

More or less intermediate linkage members are contemplated depending on the application without departure from the scope of the present invention.

More or less bow members, e.g., cross car bow members, fabric management bows, etc., are contemplated depending on the application without departure from the scope of the present invention.

More or fewer side rails are contemplated depending on the application without departure from the scope of the present invention.

More or fewer side appliques are contemplated depending on the application without departure from the scope of the present invention.

The assembly 200 bow members can be, by way of non-limiting example, be fabric management bows operably listed to a fabric cover, include a channel on the bow operably to connect to the cover, etc.

Preferably, the plurality of side appliques 208 include a pair of first appliques 270, e.g., rear appliques, and/or a pair of second appliques 272, e.g., front appliques. The pair of second appliques 272 are adapted to attach to oppositely-disposed sides of the root top opening substantially in line with the first appliques 270. By way of non-limiting example, a metal bracket 274 has a plurality of apertures 276 to connect to the second appliques 272 with a plurality of fasteners, and is adapted to connect to the vehicle, e.g., at least one aperture 278 adapted to receive a fastener adapted to connect to side member of the vehicle. The appliques 208,272 each preferably carry at least one seal that comes flush to the window glass of the rear and front vehicle doors, respectively.

Referring more particularly to FIGS. 30-35, the second applique 272, e.g., shutface applique is adapted to operably attach to the vehicle adjacent the first bow member 206 in the closed position. Preferably, at least one mounting bracket member 282 is operably connected at opposite sides of the roof top opening 180 using at least one fastener, e.g., bolts, etc. Preferably, at least one surface seal 280, e.g., bottom surface, is operably coupled to the applique 272. The seal 280 is, by way of non-limiting example, at least one foam seal strip, adapted to abut the vehicle. Preferably, at least one second seal 284 is operably coupled to the applique 272. The seal 284 is, by way of non-limiting example, a foam seal adapted to abut toward both ends of the first bow member 206 when the bow top is in the closed position.

The second applique 272 preferably includes at least one mounting attachment portion 286 with at least one aperture, the mounting attachment portion 286 adapted to operably attach at oppositely-disposed sides of the roof top opening, e.g., to side members extending from windshield frame.

Referring to the FIGS. 17-34 generally, the top cover is adapted to operably tension against the side. Preferably, a tensioning cable is sewn or otherwise attached to at least both sides of the cover and tension the cover against outer surface of both pairs of the shutface applique members 208,208 and 272, 272.

The shutface appliques 272 preferably includes at least one seal attached by ESA tape to the applique 272 and the foam engages & seals off with the profile of the bow 206. It creates the face of the sealing for the side. The cable runs in the groove and tensions tight. The assembly has no door rail. No door rail so there is an independent piece for the vehicle, e.g., an aluminum extrusion vehicle component. Composite material, tubing, aluminum extrusion, trim lock in, etc., Anything for providing a shutface interaction is contemplated and within the scope of the present invention.

Referring more particularly to FIGS. 25-29, in accordance with aspects of the present invention, the assembly 200 includes a plurality of removeable windows, e.g., at least two rear side windows, rear window, etc., adapted for selective attachment to the vehicle.

A rear corner mount is indicated generally at 292. The rear mount is adapted to operably attach to the vehicle, e.g., at oppositely-disposed rear corners/sides of the vehicle. The rear corner mount 292 is operable to secure a corner of a rear window 304, such as depicted and describe previously in this application and incorporated here. The rear corner mount 292 additionally operably incorporates or is connected to a rear side mount indicated generally at 296 each operable to selectively attach rear side windows 304,304, e.g., RH/LH quarter windows. At least one, preferably, at least two, attachment portions 297 on the rear side mount 296 each include at least one aperture 299 to adapted connect to the vehicle with at least one fastener.

The rear side mount 296 preferably includes a rear belt rail with trim lock adapted to operably secure to the vehicle, e.g., bolt on at oppositely disposed rear fender area portions of the vehicle, most preferably, operably adapted to secure to the vehicle with or without a vehicle rear fender in place.

Figure 29:
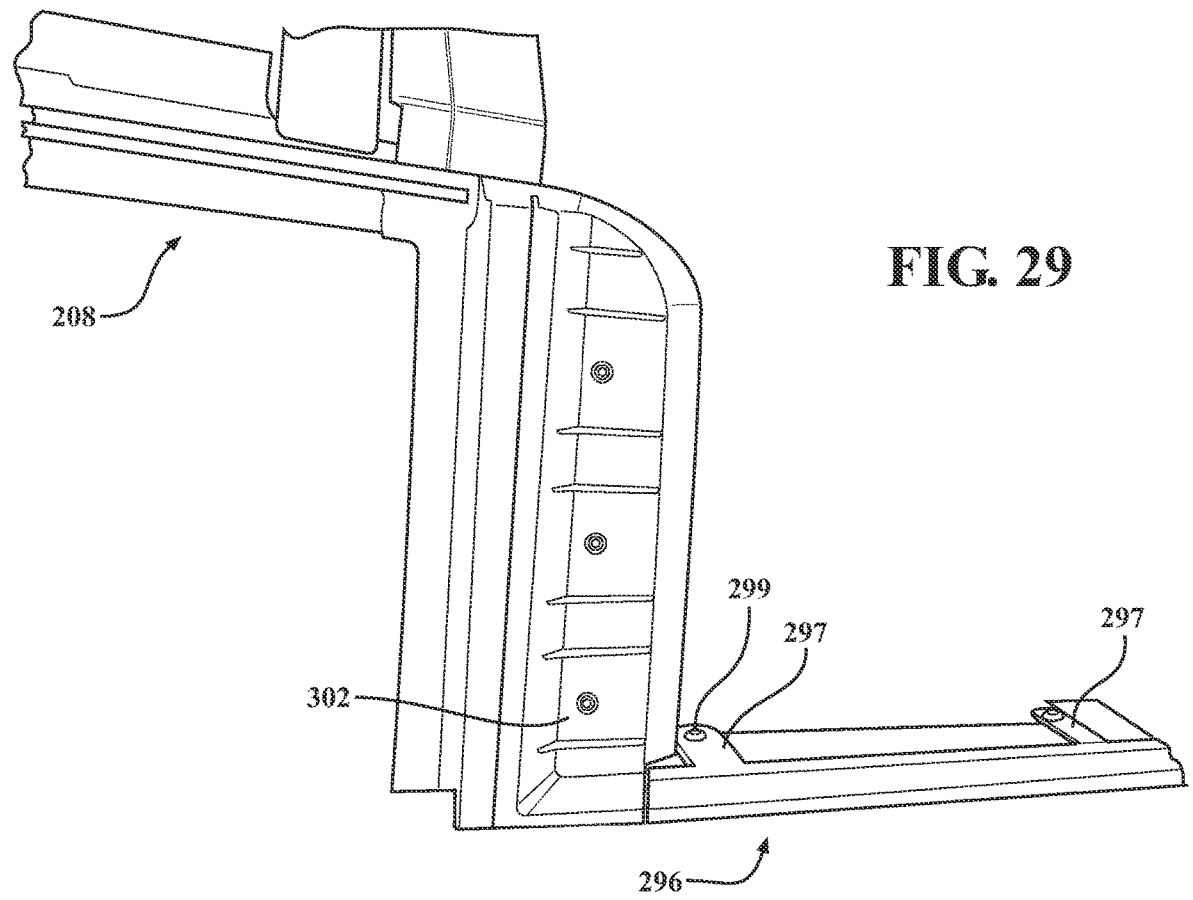
FIG. 29 is a perspective view of a vertical side molding and front shut face applique in an exemplary environment of use, in accordance with the present invention.

The rear mounts 292,296 are adapted to add an attachment for the windows in the back. By way of example, both rear side window 304 attachments and, optionally, a bottom rear cover selectively attachable for a rear window. The rear mounts 292,296 are preferably molded, e.g., extrusion, plastic, square tube, round tube, etc. The assembly 200 provides a rear belt, etc. for the rear side window edge, e.g., bottom edge with a J-hook, P-welt, or any other suitable attachment, to connect. FIG. 29 depicts an exemplary rear side window shown generally at 304.

Preferably, the assembly 200 is adapted for attachment toward the rear of the vehicle generally at opposite sides of a cargo hold opening. By way of example, a carrier of the vehicle that closes out and seals—and the present invention is adapted to attach thereto.

Preferably, the rear mounts 292,296 include a first member 298, e.g., extrusion, adapted to attach to the vehicle, e.g., riveted to existing apertures, and a second member 300 connected thereto, e.g., riveted. The rear corner mount 292 operably attaches, e.g., riveted. The rear side windows 304 operably connect to at least the side corner mount 296 and/or rear corner mount 292.

The assembly 200 also includes a front edge attachment member 302, e.g., substantially vertical extrusion, adapted to connect to the vehicle. The rear side windows 304 are operably selectively connected to the attachment member 302, e.g., J-welt, P-welt or any other suitable carrier/retainer attachment on either the member 302 or rear side window 304, or vice versa. Similarly, to the rear corner. Similarly, to the top edge. It is understood that alternative attachment on any edge is contemplated without departure from the scope of the present invention, e.g., P-weld on the window or on the top deck fabric slidably received in a corresponding channel, cooperating mechanical fit members, buckles, snaps, etc., and any combinations thereof.

Most preferably, the rear mounts 292,296 are adapted to operably connect to the vehicle, preferably, adapted to connect to an inner fender body frame portion of the vehicle. Preferably, the rear mounts 292,296 are adapted to operably connect to the vehicle advantageously to allow selective removal of an outer fender body frame portion of the vehicle. It is understood that the rear mounts 292,296 are operably adaptable for use with any aspects of the present invention depending on the application without departure from the scope of the present invention.

The assembly 200 also preferably has side tensioning members for drawing the top into the sealing groove when closed, e.g., at least one cable sewn along at least both sides of the cover adapted to tension the cover against at least the assembly.

It is understood that the right side is preferably a substantially a mirror-image of the right side.

Adapted for attachment to a sport utility vehicle or any other vehicle.

Referring to the FIGS. 1-39 it is understood that each aspect of the present invention as previously described or shown in each figure is operably adaptable and combinable depending on the particular applications without departure from the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A folding soft top cover assembly, comprising:
    a pivotal portion adapted for attaching at a roof top opening of a vehicle;
    a cover connected to the pivotal portion to selectively close off the roof top opening and open up the roof top opening for an open air experience;
    at least one pair of shut face appliques adapted to attach at both sides of the roof top opening; and
    rear hard corners operably adapted to connect to attachment features adapted to mount at a rear opening of said vehicle.

2. The folding soft top cover assembly of claim 1, wherein the appliques are adapted to be attached to roll bars of the vehicle.

3. The folding soft top cover assembly of claim 1, wherein the applique has a sealing groove that the cover engages when in the closed position.

4. The folding soft top cover assembly of claim 1, wherein the cover includes at least one side edge tensioning feature that lays in a sealing groove of the applique when in the closed position.

5. The folding soft top cover assembly of claim 1, wherein the cover engages a surface of the applique for a weather-tight seal.

6. A folding soft top cover assembly, comprising:
    a pivotal portion adapted for attaching at a roof top opening of a vehicle;
    a cover connected to the pivotal portion to selectively close off the roof top opening and open up the roof top opening for an open air experience;
    at least one pair of shut face appliques adapted to attach at both sides of the roof top opening; and
    rear hard corner trim at each rear corner of the vehicle, the rear hard corner trim attaching to a lower mount and rotating upward into an upper mount and securing in place with at least one fastener.

7. The folding soft top cover assembly of claim 1, further comprising a plurality of additional substantially similar side rail fabric sealing appliques each adapted for attaching to roll bars and that the cover draws into.

8. The folding soft top cover assembly of claim 1, further comprising quarter trim adapted to attach to the vehicle, the quarter trim including at least one groove to attach a removable rear quarter window.

9. The folding soft top cover assembly of claim 1, further comprising a connection piece for tensioning fabric to a rear bow and the tension of the fabric holds the fabric into a mount and gives the fabric a tight corner look.

10. The folding soft top cover assembly of claim 1, further comprising a rear header and a front header, the cover attached to the front header of the pivotal portion and attached to the rear header.

11. The folding soft top cover assembly of claim 1, wherein the vehicle is a sport utility vehicle.

12. The folding soft top cover assembly of claim 1, further comprising a free tilting front bow on the soft top cover assembly, the top assembly adapted for securing to the vehicle.

13. The folding soft top cover assembly of claim 1, further comprising a free tilting front bow that rides in the listing of the cover and tensions the cover over front seats of the vehicle.

14. The folding soft top cover assembly of claim 1, wherein the pivotal portion further comprises at least one pair of linkage assemblies comprising at least one first link and at least one second link, and an intermediate bow linkage operably rotatably connected to the first and second links.

15. The folding soft top cover assembly of claim 14, further comprising a second bow that is fixed between the linkage assemblies and does not independently rotate relative to the linkage assemblies.

16. The folding soft top cover assembly of claim 1, further comprising at least one cross-car bow that pivots during opening and closing of the soft top cover assembly that tensions the top cover in a closed position and then pivots for allowing opening of the top assembly.

17. A folding soft top cover assembly, comprising:
 a pivotal portion adapted for attaching at a roof top opening of a vehicle;
 a cover connected to the pivotal portion to selectively close off the roof top opening and open up the roof top opening for an open air experience;
 at least one pair of shut face appliques adapted to attach at both sides of the roof top opening; and
 a pair of rear side belt mounts adapted to rivet to existing holes in an inner fender body frame portion of the vehicle and operable to attach rear side windows.

* * * * *